(12) United States Patent
Nakashima

(10) Patent No.: US 6,859,752 B2
(45) Date of Patent: Feb. 22, 2005

(54) SPEED ADJUSTMENT CONTROL METHOD

(75) Inventor: Yasuhiro Nakashima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/469,010

(22) PCT Filed: Feb. 6, 2002

(86) PCT No.: PCT/JP02/00964
§ 371 (c)(1),
(2), (4) Date: Aug. 26, 2003

(87) PCT Pub. No.: WO02/069484
PCT Pub. Date: Sep. 6, 2002

(65) Prior Publication Data
US 2004/0088061 A1 May 6, 2004

(30) Foreign Application Priority Data
Feb. 27, 2001 (JP) .................................... 2001-052117

(51) Int. Cl.$^7$ ................................................ G01P 7/00
(52) U.S. Cl. ..................................................... 702/142
(58) Field of Search .......................... 702/96, 141, 142, 702/145, 147, 149; 701/93, 96, 110; 324/160, 162

(56) References Cited

U.S. PATENT DOCUMENTS

| 4,528,491 A | 7/1985 | Takeuchi et al. |
| 6,078,457 A | 6/2000 | Suzuki et al. |
| 2003/0105573 A1 * | 6/2003 | Ishizu et al. .................. 701/93 |

FOREIGN PATENT DOCUMENTS

| JP | 60-187123 A | 9/1985 |
| JP | 7-163195 A | 6/1995 |
| JP | 7-168626 A | 7/1995 |
| JP | 7-250498 A | 9/1995 |
| JP | 9-261015 A | 10/1997 |
| JP | 10-42597 A | 2/1998 |
| JP | 10-257244 A | 9/1998 |
| JP | 11-220364 A | 8/1999 |
| JP | 2000-139099 A | 5/2000 |

OTHER PUBLICATIONS

International Search Report for PCT/JP02/00964 dated May 21, 2002.

* cited by examiner

Primary Examiner—Michael Nghiem
(74) Attorney, Agent, or Firm—Sughrue Mion, PLLC

(57) ABSTRACT

In a speed adjustment control method, amount of variation in speed $\Delta V(a/d)$ is given precedence, number of divisions of speed during speed adjustment and number of divisions of speed adjustment time are kept variable, number of divisions is made to be maximum at all time.

4 Claims, 17 Drawing Sheets

1 AND 2 CAN USE COUNTER COMMONLY
3, 4, AND 5 CAN USE LATCH COMMONLY
STOP SIGNAL AND CLEAR SIGNAL OF LATCH ARE NOT INPUT HERE

FIG. 7

| INPUT DATA | | OUTPUT DATA |
|---|---|---|
| \|SPEED COMMAND (VS)− INITIAL SPEED (V0)\| [Hz] | SPEED ADJUSTMENT TIME (t□) [ms] | AMOUNT OF SPEED VARIATION (ΔV□) [Hz] |
| 0 ~ \|VS−V0\|max | 0 | 0 |
| 0 | 0 ~ t□max | − 0 |
| 1 ~ VWz×$2^0$ | 1 ~ t□max | ΔV□min. ×$2^0$ |
| VWz×$2^0$+1 ~ VWz×$2^1$ | 1 ~ tWz×$2^0$−1 | ΔV□min. ×$2^1$ |
| | tWz×$2^0$ ~ t□max | ΔV□min. ×$2^0$ |
| VWz×$2^1$+1 ~ VWz×$2^2$ | 1 ~ tWz×$2^0$−1 | ΔV□min. ×$2^2$ |
| | tWz×$2^0$ ~ tWz×$2^1$−1 | ΔV□min. ×$2^1$ |
| | tWz×$2^1$ ~ t□max | ΔV□min. ×$2^0$ |
| VWz×$2^2$+1 ~ VWz×$2^3$ | 1 ~ tWz×$2^0$−1 | ΔV□min. ×$2^3$ |
| | tWz×$2^0$ ~ tWz×$2^1$−1 | ΔV□min. ×$2^2$ |
| | tWz×$2^1$ ~ tWz×$2^2$−1 | ΔV□min. ×$2^1$ |
| | tWz×$2^2$ ~ t□max | ΔV□min. ×$2^0$ |
| VWz×$2^3$+1 ~ VWz×$2^4$ | 1 ~ tWz×$2^0$−1 | ΔV□min. ×$2^4$ |
| | tWz×$2^0$ ~ tWz×$2^1$−1 | ΔV□min. ×$2^3$ |
| | tWz×$2^1$ ~ tWz×$2^2$−1 | ΔV□min. ×$2^2$ |
| | tWz×$2^2$ ~ tWz×$2^3$−1 | ΔV□min. ×$2^1$ |
| | tWz×$2^3$ ~ t□max | ΔV□min. ×$2^0$ |
| VWz×$2^4$+1 ~ VWz×$2^5$ | 1 ~ tWz×$2^0$−1 | ΔV□min. ×$2^5$ |
| | tWz×$2^0$ ~ tWz×$2^1$−1 | ΔV□min. ×$2^4$ |
| | tWz×$2^1$ ~ tWz×$2^2$−1 | ΔV□min. ×$2^3$ |
| | tWz×$2^2$ ~ tWz×$2^3$−1 | ΔV□min. ×$2^2$ |
| | tWz×$2^3$ ~ tWz×$2^4$−1 | ΔV□min. ×$2^1$ |
| | tWz×$2^4$ ~ t□max | ΔV□min. ×$2^0$ |
| VWz×$2^5$+1 ~ VWz×$2^6$ | 1 ~ tWz×$2^0$−1 | ΔV□min. ×$2^6$ |
| | tWz×$2^0$ ~ tWz×$2^1$−1 | ΔV□min. ×$2^5$ |
| | tWz×$2^1$ ~ tWz×$2^2$−1 | ΔV□min. ×$2^4$ |
| | tWz×$2^2$ ~ tWz×$2^3$−1 | ΔV□min. ×$2^3$ |
| | tWz×$2^3$ ~ tWz×$2^4$−1 | ΔV□min. ×$2^2$ |
| | tWz×$2^4$ ~ t□max | ΔV□min. ×$2^1$ |
| VWz×$2^6$+1 ~ \|VS−V0\|max | 1 ~ tWz×$2^0$−1 | ΔV□min. ×$2^7$ |
| | tWz×$2^0$ ~ tWz×$2^1$−1 | ΔV□min. ×$2^6$ |
| | tWz×$2^1$ ~ tWz×$2^2$−1 | ΔV□min. ×$2^5$ |
| | tWz×$2^2$ ~ tWz×$2^3$−1 | ΔV□min. ×$2^4$ |
| | tWz×$2^3$ ~ tWz×$2^4$−1 | ΔV□min. ×$2^3$ |
| | tWz×$2^4$ ~ t□max | ΔV□min. ×$2^2$ |

□='a' STANDS FOR ACCELERATION AND 'd' STANDS FOR DECELERATION, fc = 4[MHz]
SPEED RANGE: VWz = \|VSz − V0z\|, ΔV□min. = 1, t□min. = 1

FIG.8

| INPUT DATA | | OUTPUT DATA |
|---|---|---|
| \|SPEED COMMAND (VS)- INITIAL SPEED(V0)\| [Hz] | SPEED ADJUSTMENT TIME (t□) [ms] | AMOUNT OF SPEED VARIATION (ΔV□) [Hz] |
| 0 ~ 200,000 | 0 | 0 |
| 0 | 0 ~ 32,767 | 0 |
| 1 ~ 2,000 | 1 ~ 32,767 | 1 |
| 2,001 ~ 4,000 | 1 ~ 1,023 | 2 |
| | 1,024 ~ 32,767 | 1 |
| 4,001 ~ 8,000 | 1 ~ 1,023 | 4 |
| | 1,024 ~ 2,047 | 2 |
| | 2,048 ~ 32,767 | 1 |
| 8,001 ~ 16,000 | 1 ~ 1,023 | 8 |
| | 1,024 ~ 2,047 | 4 |
| | 2,048 ~ 4,095 | 2 |
| | 4,096 ~ 32,767 | 1 |
| 16,001 ~ 32,000 | 1 ~ 1,023 | 16 |
| | 1,024 ~ 2,047 | 8 |
| | 2,048 ~ 4,095 | 4 |
| | 4,096 ~ 8,191 | 2 |
| | 8,192 ~ 32,767 | 1 |
| 32,001 ~ 64,000 | 1 ~ 1,023 | 32 |
| | 1,024 ~ 2,047 | 16 |
| | 2,048 ~ 4,095 | 8 |
| | 4,096 ~ 8,191 | 4 |
| | 8,192 ~ 16,383 | 2 |
| | 16,384 ~ 32,767 | 1 |
| 64,001 ~ 128,000 | 1 ~ 1,023 | 64 |
| | 1,024 ~ 2,047 | 32 |
| | 2,048 ~ 4,095 | 16 |
| | 4,096 ~ 8,191 | 8 |
| | 8,192 ~ 16,383 | 4 |
| | 16,384 ~ 32,767 | 2 |
| 128,001 ~ 200,000 | 1 ~ 1,023 | 128 |
| | 1,024 ~ 2,047 | 64 |
| | 2,048 ~ 4,095 | 32 |
| | 4,096 ~ 8,191 | 16 |
| | 8,192 ~ 16,383 | 8 |
| | 16,384 ~ 32,767 | 4 |

□='a' STANDS FOR ACCELERATION, 'd' STANDS FOR DECELERATION, fc = 4[MHz]
VWz=2,000, ΔV□min.=1, tWz=1,024, t□min.=1

FIG.9

| INPUT DATA | | OUTPUT DATA |
|---|---|---|
| \|SPEED COMMAND (VS) - INITIAL SPEED (V0)\| [Hz] | SPEED ADJUSTMENT TIME (t□) [ms] | AMOUNT OF SPEED VARIATION (ΔV□) [Hz] |
| 0 ~ 200,000 | 0 | 0 |
| 0 | 0 ~ 32,767 | 0 |
| 1 ~ 2,000 | 1 ~ 32,767 | 1 |
| 2,001 ~ 4,000 | 1 ~ 1 | 2 |
| | 2 ~ 32,767 | 1 |
| 4,001 ~ 6,000 | 1 ~ 1 | 3 |
| | 2 ~ 2 | 2 |
| | 3 ~ 32,767 | 1 |
| 6,001 ~ 8,000 | 1 ~ 1 | 4 |
| | 2 ~ 1 | 3 |
| | 2 ~ 3 | 2 |
| | 4 ~ 32,767 | 1 |
| 8,001 ~ 10,000 | 1 ~ 1 | 5 |
| | 2 ~ 1 | 4 |
| | 2 ~ 2 | 3 |
| | 3 ~ 4 | 2 |
| | 5 ~ 32,767 | 1 |
| 10,001 ~ 12,000 | 1 ~ 1 | 6 |
| | 2 ~ 1 | 5 |
| | 2 ~ 1 | 4 |
| | 2 ~ 2 | 3 |
| | 3 ~ 5 | 2 |
| | 6 ~ 32,767 | 1 |
| ⋮ | ⋮ | ⋮ |
| 196,001 ~ 198,000 | 1 ~ 1 | 99 |
| | 2 ~ 1 | 98 |
| | 2 ~ 1 | 97 |
| | ⋮ | ⋮ |
| | 33 ~ 49 | 3 |
| | 50 ~ 98 | 2 |
| | 99 ~ 32,767 | 1 |
| 198,001 ~ 200,000 | 1 ~ 1 | 100 |
| | 2 ~ 1 | 99 |
| | 2 ~ 1 | 98 |
| | ⋮ | ⋮ |
| | 34 ~ 49 | 3 |
| | 50 ~ 99 | 2 |
| | 100 ~ 32,767 | 1 |

= (((t□min / te□) / (fc) ¥ 1,000) × (\|VS - V0\| / ΔV - 1)) -
RAISE DECIMAL OF A RESULTANT VALUE TO THE NEXT WHOLE NUMBER □='a' STANDS FOR ACCELERATION, 'd' STANDS FOR DECELERATION, fc = 4[MHz]
VWz = 2,000, ΔV□min = 1, t□min. = 1, te□ = 0.5

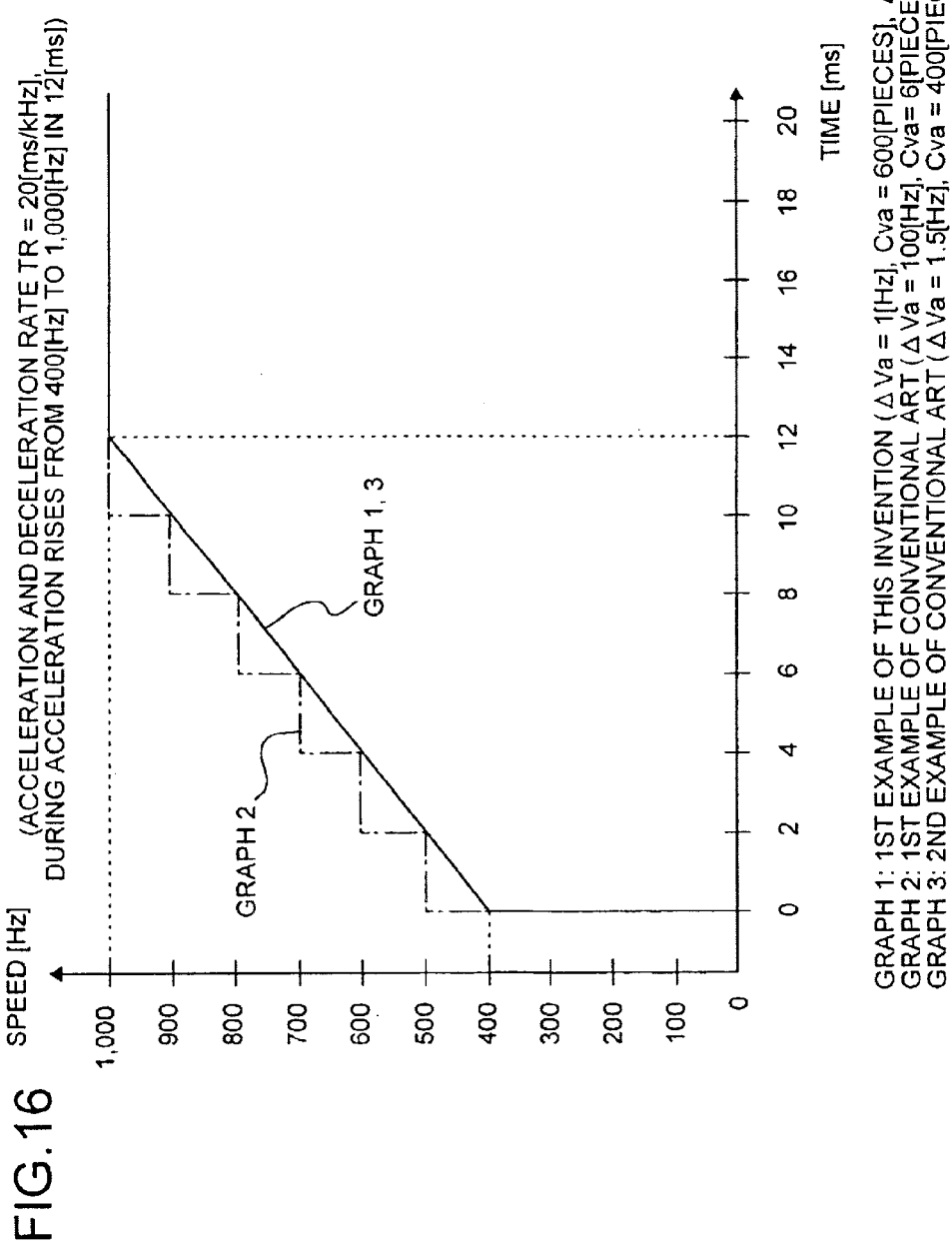

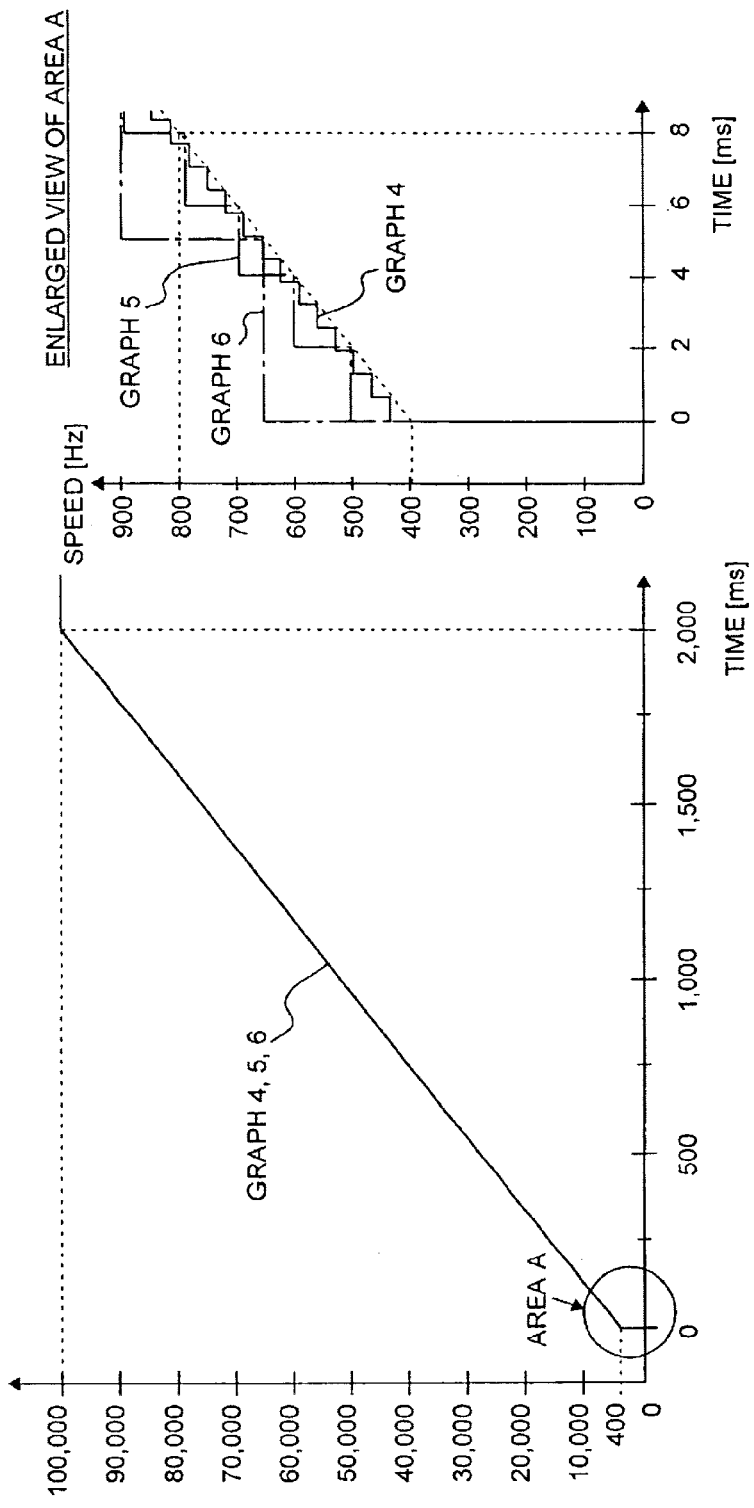

SPEED ADJUSTMENT CONTROL METHOD

TECHNICAL FIELD

The present invention relates to a controlling acceleration or deceleration (hereinafter, "speed adjustment") of a stepping motor etc., so that the speed varies smoothly.

BACKGROUND ART

A conventional speed variation control method is explained below. Conventionally, speed of, for example, a motor is varied by varying a command speed at every fixed interval. This method is called as a fixed time interval method in the explanation that follows.

FIG. 12 is a block diagram of a positioning unit that employs the fixed time interval method. A reference numeral 101 represents a speed-adjustment control block, 112 represents a central processing unit (CPU) or a computing unit (hereinafter, "computing unit"), 113 represents a variable frequency pulse generating circuit, and 114 represents a position control circuit.

The speed adjustment control block 101 includes the computing unit 112. A setting value, a reference clock, an interrupt signal, number of output pulses are input into the computing unit 112 from outside. The computing unit 112 generates and outputs a speed command value and a control signal and a setting value related to position.

The variable frequency pulse generating circuit 113 calculates a pulse string fout of variable frequency based on the speed command value-output from the computing unit 112 in the speed adjustment control block 101, and outputs the pulse string fout.

The position control circuit 114 receives the pulse string, counts this pulse string and outputs the number of output pulses to the speed adjustment control block 101. In addition to that, the position control circuit 114 compares the control signal and the setting value related to position that are received from the speed adjustment control block 101 with number of output pulses and generates a stop signal when a prescribed positioning is completed.

When the stop signal is validated, the variable frequency pulse generating circuit 113 stops the output of the pulse string.

FIG. 13 is a graph of speed variation in the fixed time interval method. In FIG. 13, a horizontal axis indicates time, a vertical axis indicates speed and an area indicates amount of shift (number of output pulses). The speed is varied (accelerated or decelerated) by varying the number of pulses output for each time interval of speed variation (control cycle: $\Delta tc$=fixed value).

During acceleration, number of divisions (CTa—where 'a' stands for acceleration) of acceleration time is calculated and taken as number of divisions (Cva) of |command speed (VS)–initial speed (V0)|. The speed is controlled by determining the number of pulses ($\Delta Y(m)a$) that are output in time $\Delta tc$.

The number of divisions during acceleration CTa is a quotient of ta/$\Delta tc$. Speed increment $\Delta V(m)a$ with respect to initial speed (V0) is $\Delta Y(m)a/\Delta tc$. Speed increment $\Delta V(m-1)a$ with respect to V0, which is just before $\Delta V(m)a$ is $\Delta V(m-1)a/\Delta tc$. Amount of variation in speed [$\Delta V(m)a-\Delta V(m-1)a$] becomes $\Delta Y(m)a/\Delta tc-\Delta Y(m-1)a/\Delta tc \approx$ |command speed (VS)–initial speed (V0)|/Cva. Here, m=(1, 2, . . . , (Cva-1), Cva).

During deceleration, number of divisions (CTd—where 'd' stands for deceleration) of deceleration time is calculated and taken as number of divisions (Cvd) of |command speed (VS)–initial speed (V0)|. The speed is controlled by determining the number of pulses (($\Delta Y(n)d$) that are ouput in time $\Delta tc$.

The number of divisions during deceleration CTd is a quotient of td/$\Delta tc$. Speed increment $\Delta V(n)d$ with respect to initial speed (V0) is $\Delta Y(n)d/\Delta tc$. Speed increment $\Delta V(n-1)d$ with respect to V0, which is just prior to $\Delta V(n)d$ is $\Delta V(n-1)d/\Delta tc$. Amount of variation in speed [$\Delta V(n)d-\Delta V(n-1)d$] becomes $\Delta Y(n)d/\Delta tc-\Delta Y(n-1)d/\Delta tc \approx$ |command speed (VS)–initial speed (V0)|/Cvd. Here, n=(Cvd, (Cvd-1), . . . ,2, 1).

The operation of the fixed time interval method is explained below with reference to FIG. 12 and FIG. 13.

The variable frequency pulse generating circuit 113 is not activated at this stage. The computing unit 112 calculates the amount of shift at the start of deceleration and calculates the number of pulses to be output $\Delta Y(m)a$ (=$\Delta Y(1)a$)+V0 that is to be output in first $\Delta tc$.

When the calculation is finished, the $\Delta Y(m)a$+V0, which is calculated earlier, is output to the variable frequency pulse generating circuit thereby activating the variable frequency pulse generating circuit. Thereafter, the computing unit 112 goes on calculating the following $\Delta Y(m)a$+V0 for each $\Delta tc$ and outputting the $\Delta Y(m)a$+V0 to the variable frequency generating circuit 113 (goes on accelerating).

The calculation and output of the following $\Delta Y(m)a$+V0 is carried out within time $\Delta tc$. In a short time, process in the command speed (VS) is carried out. While decelerating, when counter value that is counting remaining amount of shift in real time reaches the amount of shift at the start of deceleration, it goes on decelerating with the speed of $\Delta Y(n)d$+V0. When the remaining amount of shift becomes '0', the variable frequency pulse generating circuit 113 is stopped. Here, m=(1, 2, . . . , (Cva-1), Cva), n=(Cvd, (Cvd-1), . . . ,2, 1).

A control method by varying speed in which number of divisions of speed adjustment time is fixed, speed adjustment time (acceleration or deceleration time) is divided by the number of divisions (fixed value) and the speed is varied at each time interval that is obtained from the result of the division, is available as another conventional method of speed variation control. This method is called as fixed number of divisions method in the following explanation.

FIG. 14 is a block diagram of a positioning unit that employs the fixed number of divisions method. A reference 102 is a speed adjustment control block, 120 is a timing generating circuit, 121 is a memory table, 122 is a CPU or a computing unit (hereinafter, "computing unit"), 123 is a variable frequency pulse generating circuit, and 124 is position control circuit.

The speed adjustment control block 102 includes the timing generating circuit 120, the memory table 121, and the computing unit 123. A setting value, reference clock are input to the computing unit 122 from outside. The computing unit 122 calculates command speed Vp(j). The speed Vp(j) that is made to vary for each $\Delta ta(j)$ is expressed in terms of a reference clock frequency of the pulse generating circuit Vpp(j). The computing unit 122 also calculates speed variation timing $\Delta ta(j)$ during acceleration in terms of (1/base block frequency for interrupt signal) $\Delta tap(j)$ and remaining distance $\Delta Yd(g)$ during deceleration. The computing unit 122 writes the values of Vp(j), $\Delta ta(j)$, and $\Delta Yd(g)$ in the memory table 121.

Moreover, the computing unit 122 divides the speed adjustment time by the number of divisions (fixed value) and provides the resultant value of the division to the timing generating circuit 120. The timing generating circuit 120 generates an interrupt signal for each time interval provided and outputs to the computing unit 122. The computing unit 122 varies the speed command using the data in the memory table 121 and outputs to the variable frequency pulse generating circuit 123. In addition to this, the computing unit 122 outputs the control signal and the setting value related to position, current speed, and number of output pulses.

The speed command generated in the speed adjustment control block 102 is provided to the variable frequency pulse generating circuit 123 thereby obtaining pulse string of variable frequency.

The position control circuit 124 receives the pulse string, counts it and returns the number of output pulses to the speed adjustment control block 102. In addition to this, the position control circuit 124 compares the control signal and the setting value related to position that are received from the speed adjustment control block 102 with number of output pulses, and generates deceleration start signal and stop signal. Thereafter, the position control circuit 124 outputs these signals to the speed adjustment control block 102 and to the variable frequency pulse generating circuit 123. The deceleration starts when deceleration start signal is validated and the output pulse stops when the stop signal is validated.

Here, Vpp(j) is [([(number of divisions (Cvc) of |command speed(VS)−initial speed|/|command speed (VS)−initial speed|×j+initial speed]×(1/reference clock frequency of pulse generating circuit))—where numbers of five and above are rounded and anything under five is dropped]. Command speed Vp(g) that is made to vary for each ΔYd(g) is expressed in terms of reference clock frequency of the pulse generating circuit and becomes [([(number of divisions (Cvc) of |command speed(VS)−initial speed|/ |command speed (VS)−initial speed|)×g+initial speed]×(1/ reference clock frequency of pulse generating circuit))— where numbers of five and above are rounded and anything under five is dropped].

Δtap(j) is equal to [([acceleration time/number of divisions (CTc) of acceleration time]×j×reference clock frequency for interrupt signal)—where numbers of five and above are rounded and anything under five is dropped].

ΔYd(g) is a remaining number of pulses of the output pulse which becomes [(Vpp(g)×reference clock frequency of the pulse generating circuit+initial speed)×(deceleration time/number of divisions (CTc) of the deceleration time)× g]/2. Here, j=(1, 2, . . . , (Cvc−1), (Cvc)), g=(Cvc, (Cvc−1), . . . , 2,1).

FIG. 15 is a graph of speed variation in the fixed number of divisions method. In FIG. 15, a horizontal axis indicates time, a vertical axis indicates speed and an area indicates amount of shift (number of output pulses). The speed is varied by determining the amount of variation in speed, variation time, and the amount of shift remained when the number of divisions (Cvc) of |command speed (VS)−initial speed| and the number of divisions (CTc) of the speed adjustment time (acceleration or deceleration time) are fixed values.

During acceleration, [Δta(j)]≈(ta/CTc×j) indicates speed variation timing from the start of acceleration and after elapsing of time [Δta(j)] the speed variation is controlled by varying speed increment [ΔV(j)] with respect to V0.

During deceleration, a value obtained by subtracting a current value of number of output pulses from amount of command shift is counted (amount of shift that is remained, is indicated in real time). When this calculated value reaches the amount of shift remained, the speed increment [ΔV(g)] with respect to V0 is made to vary, thereby controlling the speed variation.

The amount of variation in speed [ΔV(j))−ΔV(j−1)] becomes [ΔV(g)−ΔV(g−1)]≈(|command speed (VS)−initial speed|/Cvc). Here, j=(1, 2, . . . , (Cvc−1), Cvc) and g=(Cvc, (Cvc−1), . . . , 2, 1).

The operation in the fixed number of divisions method is explained below while referring to FIG. 15 and FIG. 16.

The variable frequency pulse generating circuit 123 is not activated at this stage. The computing unit 122 calculates the Δtap(j), Vpp(j)=Vpp(g) required at the time of acceleration, ΔYd(g) required at the time of deceleration and writes values of Δtap(j), Vpp(j)=Vpp(g) and ΔYd(g) in the memory table 121.

The variation frequency pulse generating circuit is activated. Therefore, acceleration is carried out with the speed Vp=[ΔV(j)+V0] for each ΔYd(g). Thereafter, when the counter value, which is counting the amount of shift remained in real time, reaches ΔYd(g), deceleration is carried out with the speed of Vp=[ΔV(g)+V0] and when the amount of shift remained becomes '0', the variable frequency pulse generating circuit 123 stops. Here, j=(1, 2, . . . , (Cvc−1), Cvc) and g=(Cvc, (Cvc−1), . . . , 2, 1).

Japanese Patent Application laid open Publication No. 1998-42597 discloses a stationary recording disc in an information recording apparatus. This publication teaches use of an acceleration region that is increased in form of steps, for frequency step range Δf a value obtained by dividing [target frequency (rated number of revolutions region) f3−starting speed f2] by 8. This is a method in which time range Δt corresponding to the value of Δf obtained is made to be Δt=t2/8.

In the fixed time interval method, since the time interval is fixed, as the speed adjustment time becomes short, the number of divisions of time and the number of divisions of speed become smaller and the amount of variation in speed becomes large. Due to the large amount of variation in speed the stepping motor becomes apt to lose synchronism (misstepping), which is a problem in this conventional method.

Generally, in positioning control carried out by the fixed time interval method, it is necessary to increase the number of divisions to avoid the loss of synchronism. However, since calculation is carried out one after another for each control cycle Δtc, there is always load on calculating machine (microcomputer, computing unit etc.) and it is not possible to deal with increased number of control axes. In such case, it is necessary to make the control period Δtc long or to improve performance of the calculating machine or to increase the number of calculating machines. However, improving the performance of the calculating machine increases the cost, increasing of number of clocks makes it weaker to noise, and increasing the number of calculating machines results in increase in mounting area, thereby making the size bigger. Consequently, increasing of control axes proved to be disadvantageous.

Furthermore, the speed during the speed adjustment does not change in multiples of minimum speed and correct monitoring of speed becomes impossible.

Moreover, in positioning control carried out by the fixed time interval method, it is necessary to increase the number of divisions considering the performance of the calculating machine to avoid the loss of synchronism. Therefore, the speed adjustment time has to be set longer which results in a longer tact time (positioning time).

FIG. 16 is a graphical representation of problems in the fixed time interval method. A graph 2 is obtained with the conventional fixed time interval method, a graph 1 is obtained according to the present invention, and a graph 3 is obtained with another conventional fixed number of divisions method. As is clear from this figure, since the time interval is fixed, the speed variation during acceleration in graph 2 is in the form of steep steps.

On the other hand, in the fixed number of divisions method, since the number of divisions is fixed, as the value of |command speed (VS)−initial speed| becomes bigger, the amount of variation in speed also increases thereby making the stepping motor apt to lose synchronism.

Generally, in positioning control carried out by the fixed number of divisions method, it is necessary to set the speed adjustment time longer. However, when the speed adjustment time is set to be longer, the tact time (positioning time) becomes longer.

Moreover, it is necessary to increase the number of divisions so as to decrease the amount of variation in speed, and increase in number of divisions results in increase in values of $\Delta ta(j)$, $\Delta V(j)$, and $\Delta Yd(g)$. Due to this, calculating time and time for writing in memory increase and time before start up becomes longer. This results is the tact time becoming longer and also it is necessary to increase memory that stores $\Delta ta(j)$, $\Delta V(j)$, and $\Delta Yd(g)$, thereby increasing cost and required space.

Furthermore, the speed during the speed adjustment does not change in multiples of minimum speed and correct monitoring of speed becomes impossible.

FIG. 17 is a graphical representation of problems in the fixed number of divisions method. Graph 6 is obtained with the conventional fixed number of divisions method, graph 4 is obtained according to the present invention, and graph 5 is obtained with another conventional fixed time interval method. As is clear from this figure, since the number of divisions is fixed, the speed variation during acceleration in graph 6 is in the form of steep steps.

About the speed variation control method from the starting speed f2 up to the target frequency (rated number of revolutions region f3) is not mentioned in the Japanese Patent Application Laid Open Publication No. 1998-42597. Therefore, it is not known whether it is possible to shorter the acceleration time according to the technology disclosed in this publication. Also, time required for preparatory calculation and load of calculation process is not known.

It is an object of the present invention to solve at least the problems in the conventional technology.

DISCLOSURE OF THE INVENTION

The speed adjustment control method according to the present invention comprises a process of determining an amount of variation in speed $[\Delta V(a/d)]$ from a data table of |command speed (VS)−initial speed (V0)| and speed adjustment time $[t(a/d)]$; a process of determining number of divisions $[cv(a/d)]$ of |command speed (VS)−initial speed (V0)| by dividing |command speed (VS)−initial speed (V0)| by the amount of variation in speed $[\Delta V(a/d)]$; a process of determining number of divisions $[CT(a/d)]$ of the speed adjustment time by subtracting 1 from the number of divisions $[cv(a/d)]$ of |command speed (VS)−initial speed (V0)|; a process of determining an interval of speed variation $[\Delta t(a/d)]$ by dividing the speed adjustment time $[t(a/d)]$ by the number of divisions $[CT(a/d)]$ of the speed adjustment time; a process of determining, during acceleration, speed by adding the amount of variation in speed $[\Delta V(a)]$ to the initial speed (V0), and determining subsequent speed at each speed variation interval $[\Delta t(a)]$ by adding the amount of variation in speed $[\Delta V(a)]$ to previously determined speed; a process of switching over to the command speed (VS) when the speed determined is equal to the command speed (VS); and a process of determining, during deceleration, speed by subtracting the amount of variation in speed $[\Delta V(d)]$ from the command speed (VS) or current speed, and determining subsequent speed at each speed variation interval $[\Delta t(a)]$ by subtracting the amount of variation in speed $[\Delta V(d)]$ from previously determined speed.

Moreover, the speed variation interval $[\Delta t(a/d)]$ is variable and provided independently from a control cycle that generates output pulses.

Furthermore, speed adjustment control method according to the present invention prepared a data table with a process of inputting parameters the initial speed (V0), a minimum value (VSmin) of the command speed, a maximum value (VSmax) of the command speed, the speed adjustment time $[t(a/d)]$, a minimum value $[t(a/d)min]$ of the speed adjustment time, a maximum value $[t(a/d)max]$ of the speed adjustment time, a tolerance range condition $[te(a/d)]$ of the speed adjustment time $[t(a/d)]$, a condition for the amount of variation in speed, a control frequency (fc), and rank classification time (tWz) of the speed adjustment time; a process of determining a limit range (VWz) of speed difference based on the data mentioned above; a process of classifying |command speed (VS)−initial speed (V0)| in ranks in the limit range (VWz) of speed difference based on the limit range (VWz) of difference and rank classification time (tWz) of the speed adjustment time; a process of classifying the speed adjustment time $[t(a/d)]$ in ranks in the rank classification time (tWz); and a process of determining the amount of variation in speed $[\Delta V(a/d)]$ in accordance with a combination of the |command speed (VS)−initial speed (V0)| and the speed adjustment time $[t(a/d)]$.

Moreover, classification of rank in the limit range (VWz) of speed difference |command speed (VS)−initial speed (V0)| is carried out by (VWz×power of 2) and classification of rank in the rank classification time (tWz) of the speed adjustment time $[t(a/d)]$ is carried out by (tWz×power of 2). The amount of variation in speed $[\Delta V(a/d)]$ is determined by minimum value of command speed (VSmin)×power of 2.

BRIEF DESCRIPTION OF THE DRAWINGS

FIG. 8 is also an example expressed as a flowchart;

FIG. 7 is a data table showing how to find out the amount of variation in speed $[\Delta V(a/d)]$ during the speed adjustment time in this invention;

FIG. 8 is an example when VWz in FIG. 7 is substituted by 2,000;

FIG. 9 is a data table in which the amount of variation in speed [ΔV(a/d)] is made smaller;

FIG. 16 is a comparison of speed variation between an example of this invention and that of a conventional method at speed adjustment rate of 20[ks/kHz] and during acceleration from 400[Hz] to 1,000[Hz] in 12[ms]; and FIG. 17 is a comparison of speed variation between an example of this invention and that of a conventional invention at the speed adjustment rate of approximately 20[ms/kHz] and during acceleration from 400[Hz] to 1,000[Hz] in 2,000[ms].

BEST MODE FOR CARRYING OUT THE INVENTION

Figure 1:
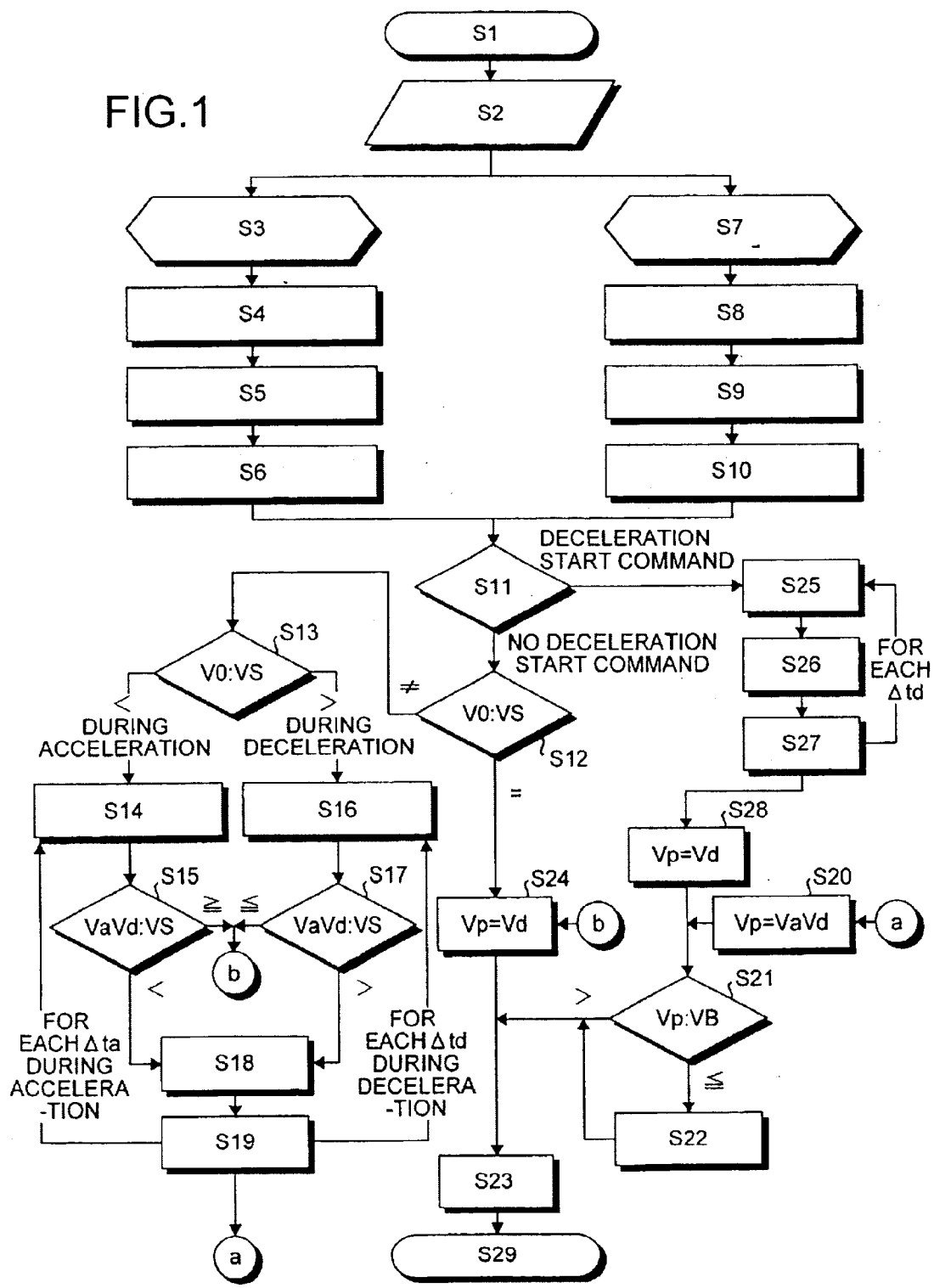
FIG. 1 explains speed adjustment method (amount of variation in speed priority method) according to the present invention.
Figure 2:
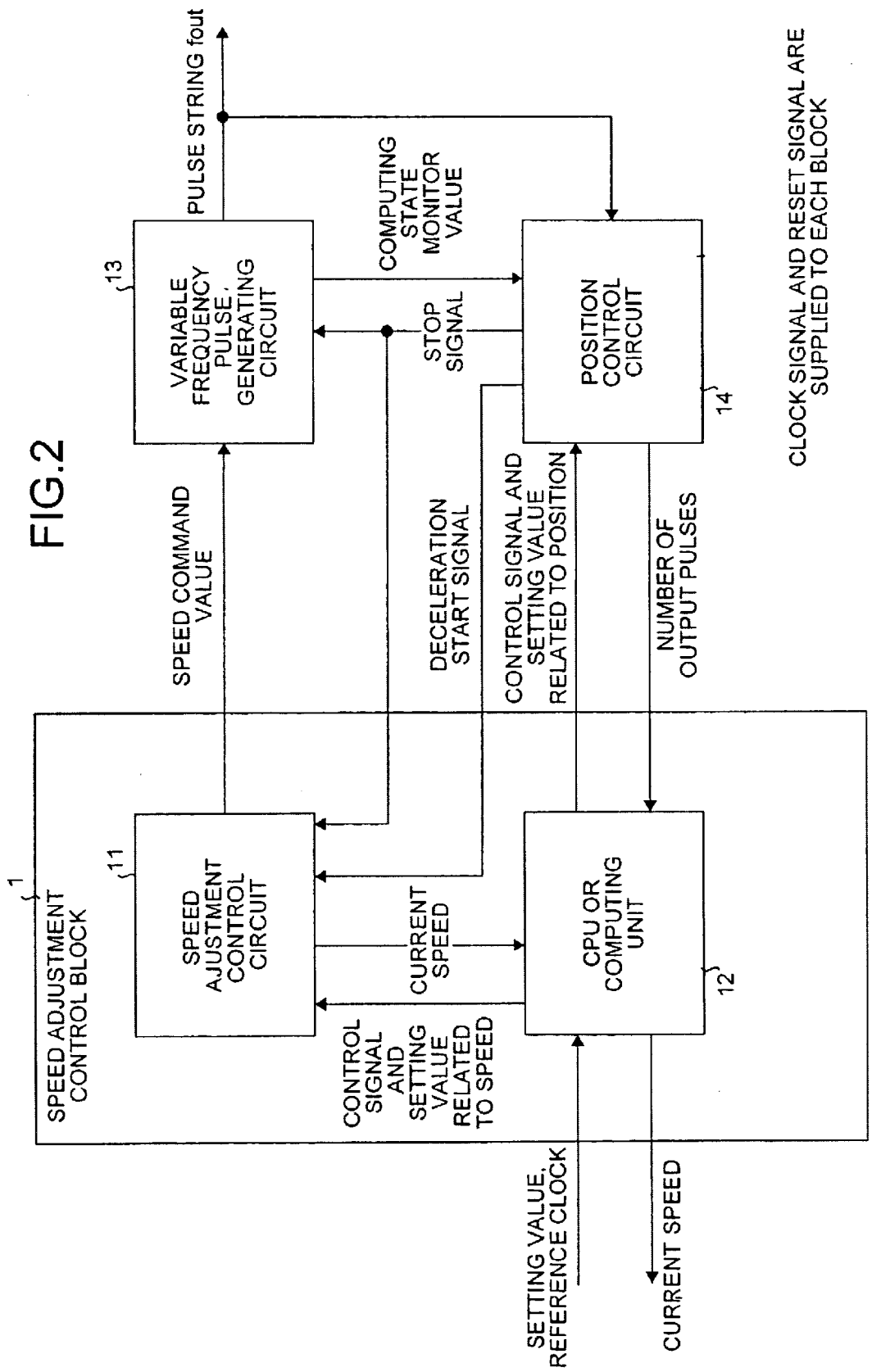
FIG. 2 is a block diagram of a device that realizes the amount of variation in speed priority method according to the present invention.

FIG. 1 is a flowchart of an amount of variation in speed priority method, which is a speed variation control method, in this invention. This flowchart lists the procedure conducted by a speed adjustment control block 1. FIG. 2 is a block diagram of a positioning unit that employs the speed variation control method according to the present invention.

In the figures, a reference numeral 1 represents a speed adjustment control block, 11 represents a speed adjustment control circuit, 12 represents a CPU or a computing unit, 13 represents a variable frequency pulse generating circuit, and 14 represents a position control circuit. An example of construction of the variable frequency pulse generating circuit 13 is disclosed in Japanese Patent Application Laid Open Publication No. 1999-220364.

Following is an explanation of outline of operation in a first embodiment according to the present invention.

A setting value, a reference clock, number of output pulses, a deceleration start signal, and a stop signal are input to the speed adjustment control block 1 from outside. The speed adjustment control block 1 generates a prescribed speed command and outputs a speed command value, setting value related to position, a control signal, and current speed.

The speed command value generated in the speed adjustment control block 1 is provided to the variable frequency pulse generating circuit 13 and the variable frequency pulse generating circuit 13 obtains and outputs a pulse string (fout) of variable frequency.

The position control circuit 14 receives and counts the pulse string and returns the number of output pulses to the speed adjustment control block 1. The position control circuit 14 receives the control signal and the setting value related to position from the speed adjustment control block 1 and generates a deceleration signal and a stop signal. The position control circuit 14 outputs the deceleration start signal to the speed adjustment control block 1 and outputs the stop signal to the speed adjustment control block 1 and to the variable frequency pulse generating circuit 13. When the deceleration start signal is validated, the deceleration starts and when the stop signal is validated, the pulse string is not output.

The computing unit 12 receives the setting value and the reference clock from outside. The computing unit 12 calculates and generates the control signal and the setting value related to speed and the control signal and the setting value related to position. The computing unit 12 outputs the control signal and the setting value related to speed to the speed adjustment control circuit 11 and outputs the control signal and the setting value related to position to the position control circuit 14. Moreover, the computing unit 12 outputs the number of output pulses received from the position control circuit 14 and the current speed received from the speed adjustment control circuit 11 to the outside.

The speed adjustment control circuit 11 generates the speed command value based on the control signal and the setting value related to speed received from the computing unit 12 and the declaration start signal and the stop signal received from the position control circuit 14 and outputs the speed command value to the variable frequency pulse generating circuit 13.

An explanation of operation of the speed adjustment control block 1 will now be given while referring to FIG. 1 and FIG. 3.

FIG. 1 shows a control method executed by the speed adjustment control block 1. Steps from S1 to S10 are processed in the computing unit 12 and steps from S11 to S29 are processed in the speed adjustment control circuit 11. FIG. 3 is an illustration of internal structure of the speed adjustment control circuit 11.

Figure 3:
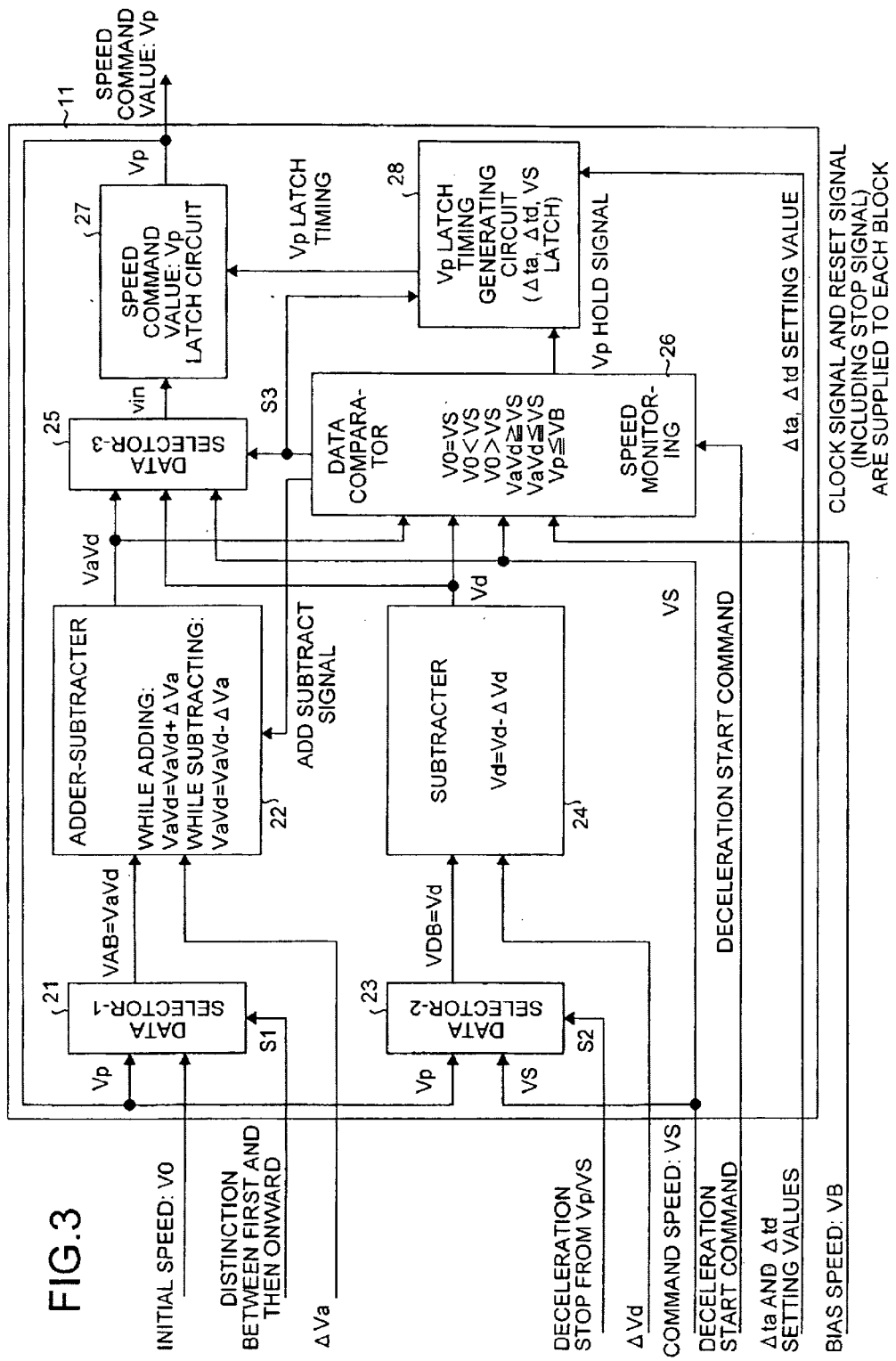
FIG. 3 is a block diagram of a speed adjustment control circuit that realizes the amount of variation in speed priority method.

In FIG. 3, 21 is a data selector-1, 22 is an adder-subtracter, 23 is a data selector-2, 24 is a subtracter, 25 is a data selector-3, 26 is a data comparator, 27 is a speed command value Vp latch circuit, and 28 is a Vp latch timing generating circuit.

To start with, in step S1, amount of variation in speed during acceleration (ΔVa) and amount of variation in speed during deceleration (ΔVd) are determined using a [ΔV(a/d)] data table. A value already determined is provided here. (explained later)

In step S2, command speed (VS), initial speed (V0), acceleration time (ta), deceleration time (td), amount of variation in speed during acceleration (ΔVa), and amount of variation in speed during deceleration (ΔVd) are received as input. The acceleration is taken care of at step S3 and the deceleration is taken care of at step S7.

In step S3, previous command speed (VSb) or bias speed (VB) is taken as initial speed (V0) during acceleration.

In step S4, number of divisions of |VS−V0| during acceleration time (Cva) are calculated by using Cva=(|VS−V0|/ΔVa: raising decimal of a resultant value to the next whole number).

In step S5, number of divisions (CTa) of acceleration time are calculated by using CTa=(Cva−1).

In step S6, speed variation interval (Δta) of acceleration time is calculated by using Δta=(quotient of ta/CTa).

In step S7, only bias speed (VB) is taken as initial speed in deceleration time.

In step S8, number of divisions (Cvd) of |VS−V0| is calculated by using Cva=(|VS−V0|/ΔVd : raising decimal of a resultant value to the next whole number).

In step S9, number of divisions (CTd) of deceleration time is calculated by CTd=(Cvd−1).

In step S10, speed variation interval (Δtd) of deceleration time is calculated by using Δtd=(quotient of td/CTd).

The steps from S1 to S10 are carried out by the computing unit 12 as preparation before starting of pulse output.

The speed adjustment control circuit configured as in FIG. 3 based on step 11 onward.

To start with, in step 11, it is checked whether a deceleration start command is received. When the deceleration start command is received, process in step S25 is carried out and when the deceleration start command is not received, process in step S12 is carried out.

In step S12, V0 and Vs are compared with each other. When V0=VS, process in step S24 is carried out and when V0≠VS, process in step S13 is carried out.

In step S13, V0 and VS are compared with each other. When V0>VS, process in step S16 is carried out and when V0<VS, process in step S814 is carried out.

In step S14, speed during acceleration (VaVd) is calculated by using VaVd=(VaVd+ΔVa).

Here, the previous command speed (VSb) or bias speed (VB) is taken as initial value of VaVd.

In step S15, VaVd and VS are compared with each other. When VaVd≧VS, process in step S24 is carried out and when VaVd<VS, process in step S18 is carried out.

On the other hand, in step S16, speed during acceleration (VaVd) is calculated by VaVd=(VaVd−ΔVa). In this case, only command speed (VSb) is an initial value of VaVd.

In step S17, VaVd and VS are compared with each other. When VaVd<VS, process in step S24 is carried out and when VaVd>VS, process in step S18 is carried out.

In step S18, Δta clock is generated.

In step S19, VaVd is latched for each Δta. Further, for acceleration during acceleration time, steps S14, S15, S18, and S19 are carried out for each Δta. On the other hand, for deceleration during acceleration time, steps S16, S17, S18, and S19 are carried out for each Δtd.

In step S20, speed command value (Vp) is calculated by using Vp=VaVd.

In step S21, Vp and VB are compared with each other. When Vp>VB, process in step S23 is carried out and when Vp≦VB, process in step S22 is carried out.

In step S22, previous Vp is held till stop.

In step S23, Vp is latched and in step S29 Vp is output to the variable frequency pulse-generating unit 13.

In step S24, Vp is taken as VS; in step S23, Vp is latched; and in step S29, Vp is output to the variable frequency pulse generating unit 13.

In step S25, speed (Vd) during deceleration is calculated by using Vd=(Vd−ΔVd). Here, speed command value (Vp) or command speed (VS) is taken as initial value of Vd.

In step S26, Δtd clock is generated.

In step S27, Vd is latched for each Δtd.

Steps S25 to S27 are carried out for each Δtd.

In step S28, speed command value (Vp) is calculated by using Vp=Vd and process in step S21 is carried out.

Figure 4:
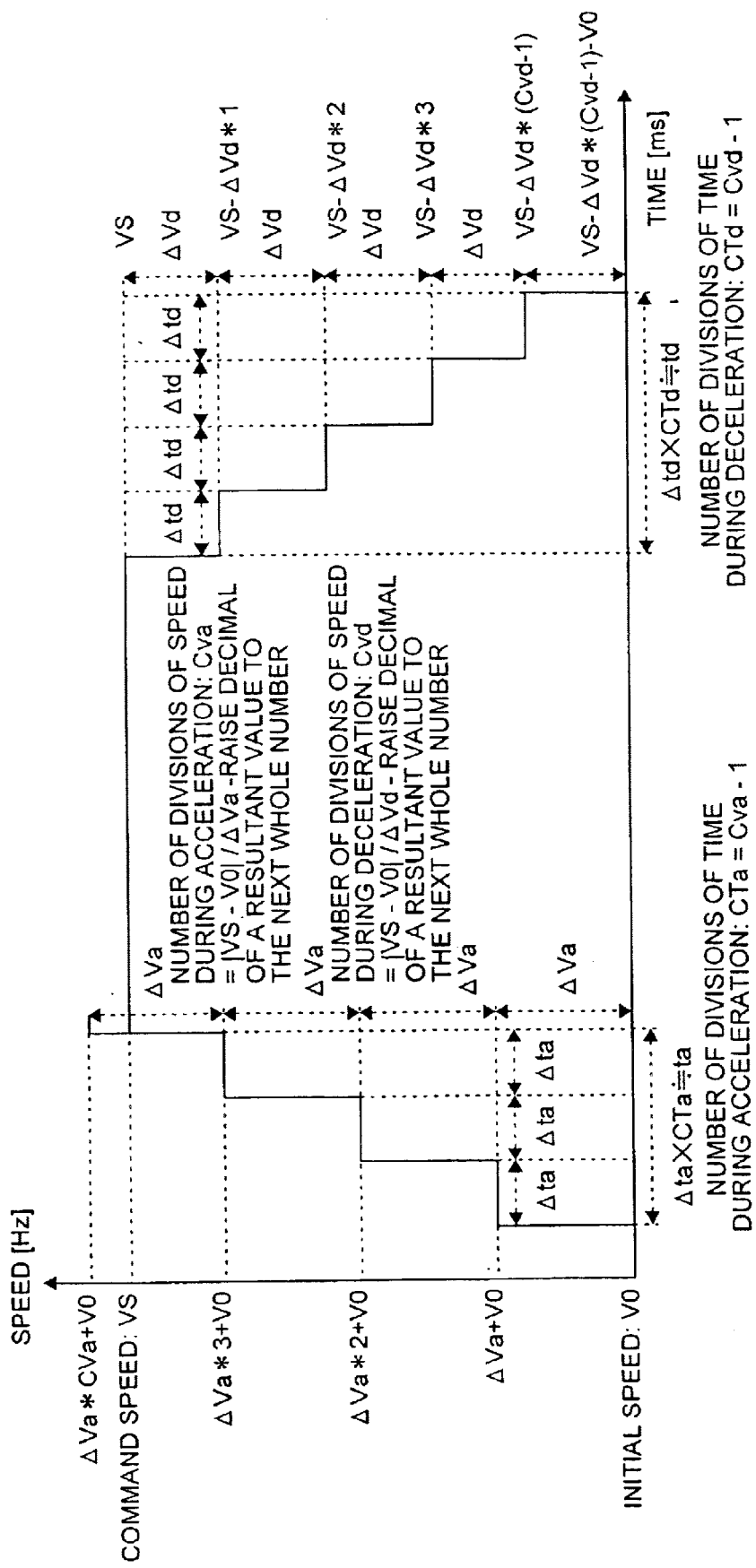
FIG. 4 is an illustration for explaining an example of speed change according to the present invention (amount of variation in speed priority method)

FIG. 4 shows speed variation in the amount of variation in speed priority method, which is a speed variation control method in the present embodiment. The amount of variation in speed [ΔV(a/d)] is determined using the data table taking precedence over speed variation interval [Δt(a/d)] and then number of divisions (Cv) of |command speed(VS)−initial speed (V0)| is determined by Cv(a/d)=(|command speed (VS)−initial speed (V0)|/ΔV(a/d): raising decimal of a product value to the next whole number). Thereafter, number of divisions [CT(a/d)] of the acceleration time is determined by using CT(a/d)=[Cv(a/d)−1] and speed variation interval [Δt(a/d)] is determined by using Δt(a/d)=[quotient of t(a/d)/CT(a/d)]. In this case, t(a/d) is acceleration or deceleration time i.e., t(a) is acceleration time and t(d) is deceleration time.

Moreover, by providing the speed variation interval Δt(a/d) irrespective of the control cycle that generates output pulse, it is possible to have variable value instead of a fixed value.

Further, during acceleration, start up is carried out at a speed obtained by adding the amount of variation in speed ΔVa to the initial speed (V0). Speed after the speed variation interval Δta, is a value obtained by adding amount of variation in speed ΔVa to the previous speed and after elapsing of every speed variation interval Δta, the amount of variation in speed ΔVa is added to the previous speed to give speed. This is carried out iteratively.

When the command speed (VS) is attained, changeover to command speed is carried out.

When deceleration start timing is provided, speed changes over to value obtained by subtracting amount of variation in speed ΔVd from the command speed (VS) or current speed. Speed after the speed variation interval Δtd, is a value obtained by subtracting amount of variation in speed ΔVd from the previous speed and after elapsing of every speed variation interval Δtd, the amount of variation in speed ΔVd is subtracted from the previous speed to give speed. This is carried out repeatedly. Either command shift amount is attained or stops when stop command is provided.

The method mentioned above can be realized by either of software and hardware.

In the first embodiment, amount of variation in speed ΔV(a/d) is given precedence, number of divisions of speed during speed adjustment and number of divisions of speed adjustment time are kept variable, number of divisions is made to be maximum at all time. Since the speed adjustment is carried out by varying the output speed for each speed variation interval Δt(a/d), the stepping motor can not lose synchronism easily. Moreover, the speed adjustment time, processing time till start up and tact time can be shortened and plurality of axes control can be realized.

Following is an explanation of configuration of a second embodiment of the present invention.

Figure 5:
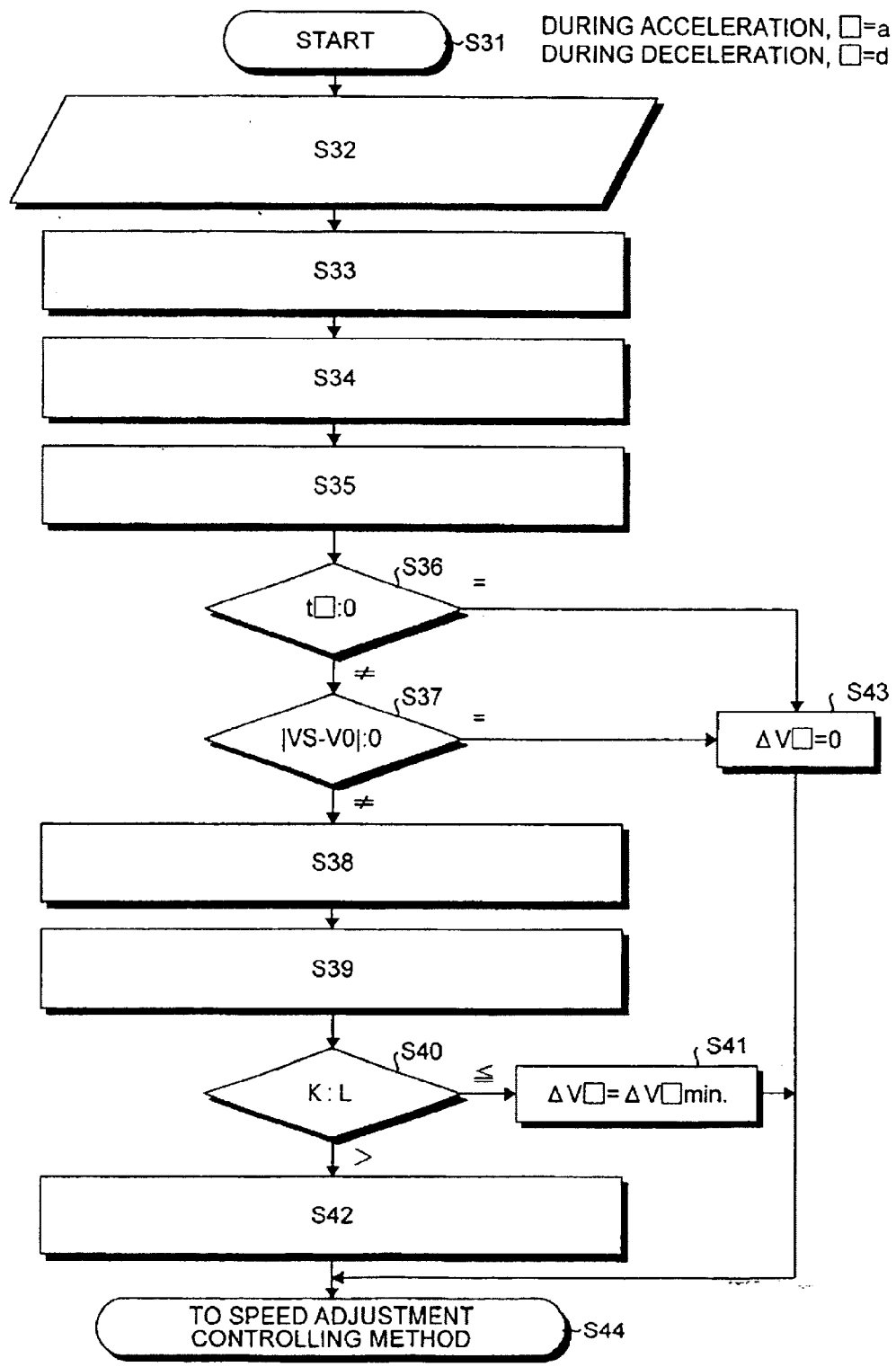
FIG. 5 illustrates a method of making a data table of the amount of variation in speed $[\Delta V(a/d)]$.

FIG. 5 is a flowchart of a method for generating a data table of amount of variation in speed [ΔV(a/d)] in this embodiment. This process is carried out by the computing unit 12.

Figure 6:
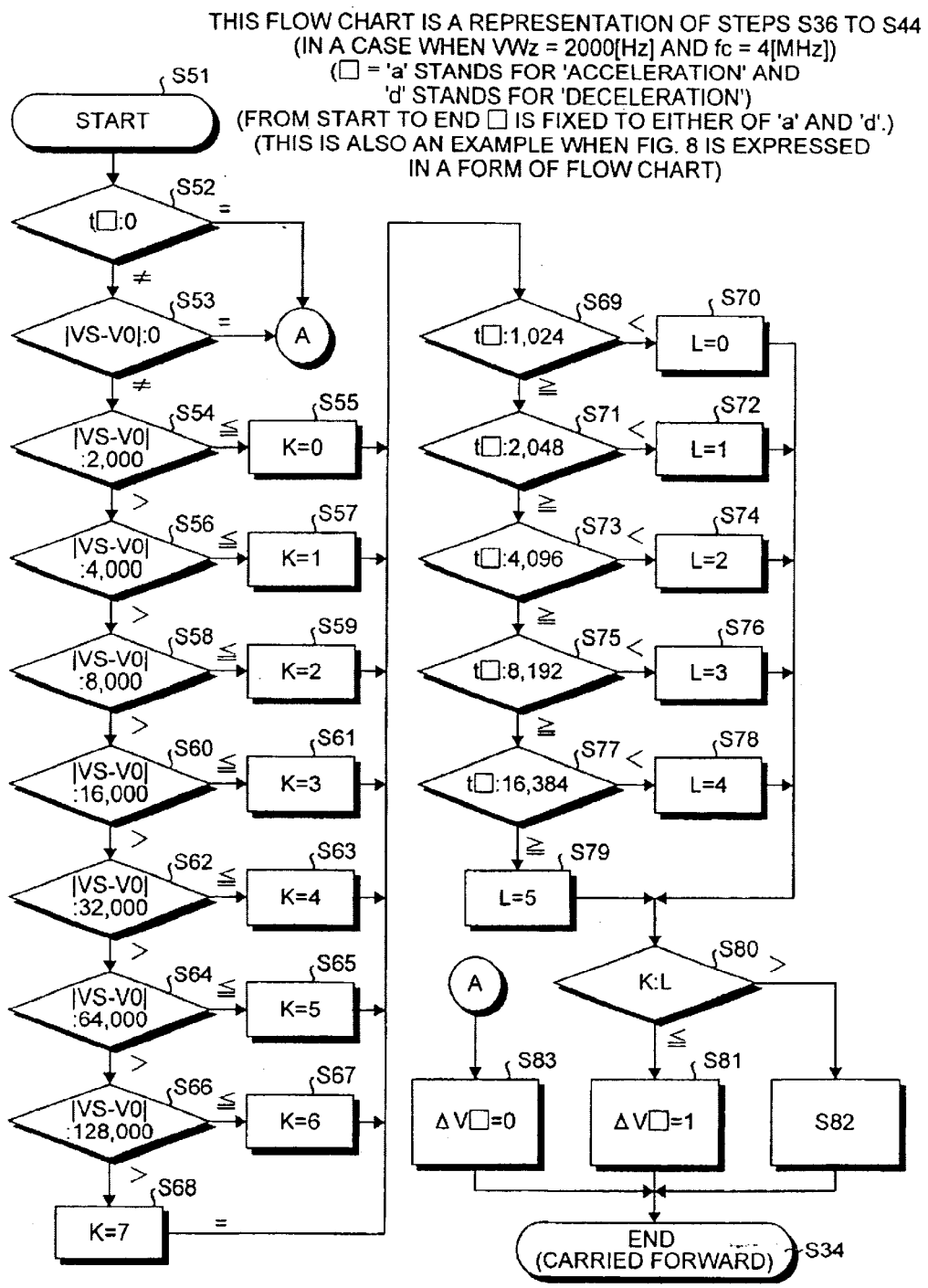
FIG. 6 is an example of steps 36 to 44 in FIG. 5 expressed as a flowchart.

Steps from S31 to S35 is a process already determined by the computing unit 12 and steps from S36 to S44 can also be expressed as shown in FIG. 6.

Following is an explanation of operation in the second embodiment.

Step S31 indicates starting of process.

In step S32, data is received as input. Here, command value (VS), minimum value of the command speed (VSmin), maximum value of the command speed (VSmax), initial speed (V0), speed adjustment time [t(a/d)], minimum value of speed adjustment time [t(a,d)min], maximum value of the speed adjustment time [t(a,d)max], tolerance range condition [te(a/d)] of t(a,/d), condition of ΔV(a/d) (|VSx−V0x| and less than or equal to ΔVx(a/d), control frequency (fc), and rank classification time (tWz) of t(a/d) are received as input. In this case, acceleration is represented by 'a' and deceleration is represented by 'd'.

In step S33, maximum value [CV(a/d)max] of number of divisions |VS−V0| is calculated by using Cv(a/d)max=(VWz/ΔV(a/d)min)≦(|VSmax−V0min|/ΔV(a/d)min), number of divisions [Cvx(a/d)] of required |VS−V0| is calculated by using (|VSx−V0x|/ΔV(a/d)≦Cvx≦Cv(a/d)max, limit range (VWz) of speed difference is calculated by using VWz=|VSz−V0z|≦|VSmax−V0min|, and minimum value of amount of variation in speed [ΔV(a/d)] is calculated by using ΔV(a/d)min=VSmin.

In step S34, maximum value [CT(a/d)max] of number of divisions of speed adjustment time is calculated by using [CT(a/d)max=[Cv(a/d)max−1]≦[te(a/d)×fc] and number of divisions [CTx(a/d)] of required speed adjustment time are calculated by using CTx(a/d)=[Cvx(a/d)−1]≦CT(a/d)max.

In step S35, Cv(a/d)max is calculated by using Cv(a/d)max=[CT(a/d)max+1]≦[te(a/d)×fc+1] and suitable value of Cv(a/d)max is determined. An example of method for determining a suitable value is [te(a/d)×fc].

The best value can be obtained by using (te(a/d)×fc).

Thus, from the explanation given above, VWz=[Cv(a/d)max×ΔV(a/d)min].

Figure 10:
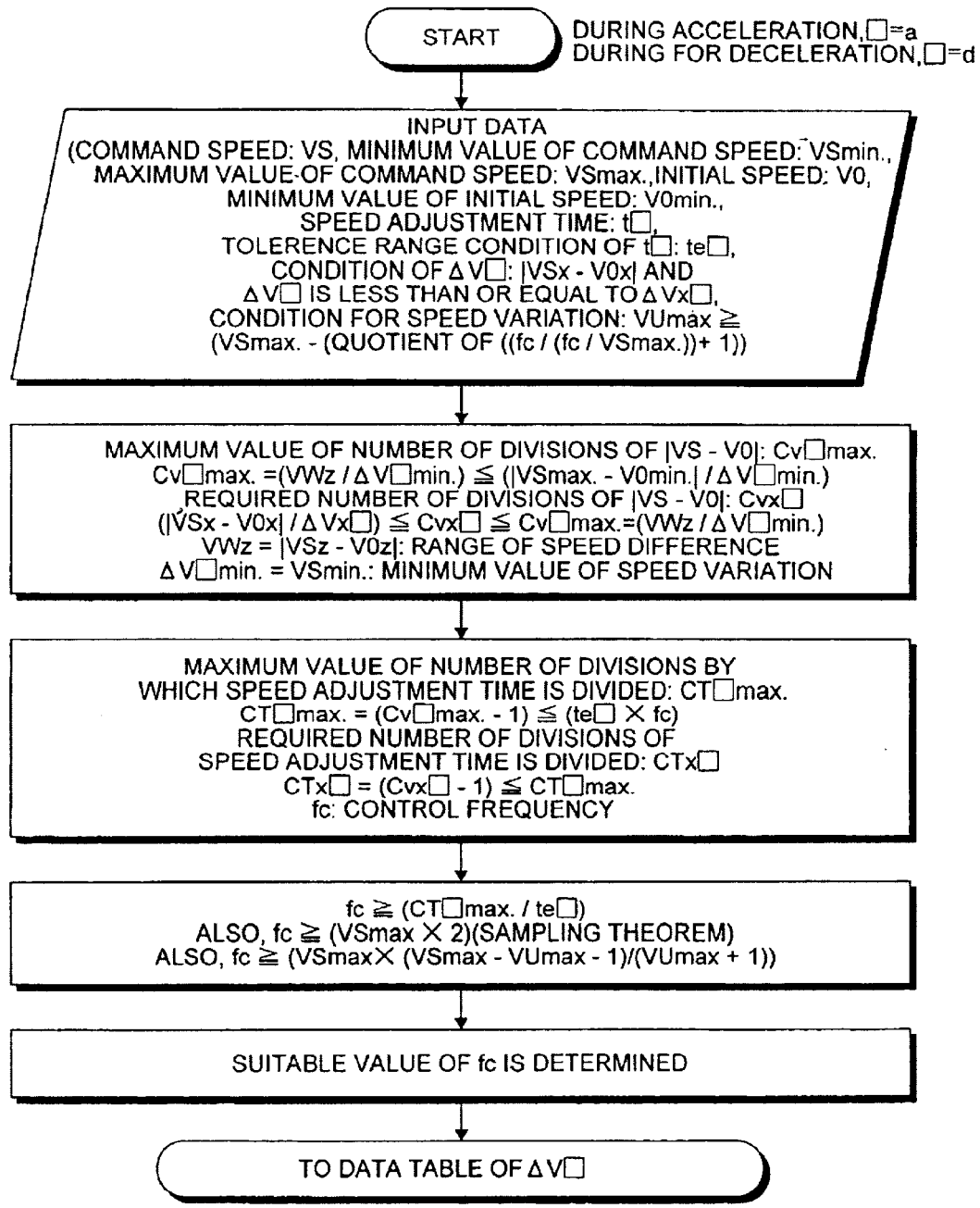
FIG. 10 is an illustration of calculation method of control frequency (fc)

Since the value of fc is calculated based on the method described in FIG. 10 to satisfy the equations used in step S33, the relations of those equations are satisfied when the value of VWz is substituted in those equations.

In step S36, t(a/d) is compared with 0. When t(a/d)=0, process in step S43 is carried out and when t(a/d)≠0, process in step S37 is carried out.

In step S37, |VS−V0| is compared with 0. When |VS−V0|=0, process in step S43 is carried out when |VS−V0|≠0, process in step S838 is carried out.

In step S38, rank (K) of |VS−V0| is taken as K=0, 1, 2, . . . (integer) and calculated by using [VWz×((K−1)th power of 2)+ΔV(a/d)]min≦|VS−V0|≦[VWz×(K)th power of 2]. However, when K=0, [VWz×((K−1)th power of 2)+ΔV(a/d)min]=ΔV(a/d)min.

Moreover, it is assumed that [VWz×(K)th power of 2]max≦|VS−V0|max=VSmax.

In step S39, rank (L) of t(a/d) is L=−1, 0, 1, 2, . . . (integer) and calculated by using [tWz×(L)th power of 2]≦t(a/d)≦[tWz×((L+1)th power of 2)−t(a/d)min. However, when L=−1, [tWz×(L)th power of 2]=t(a/d)min.

Moreover, it is assumed that [tWz×((L+1)th power of 2)−t(a/d)min]max≦t(a/d)max.

In step S40, K is compared with L. If K>L, process in step S42 is carried out; and if K≦L, process in step S41 is carried out.

In step S41, ΔV(a/d)=ΔV(a/d)min.

In step S42, ΔV(a/d)=ΔV(a/d)min (where ΔV(a/d)min is expressed in binary numbers and is a value obtained by left shift of (K−L).

In step S43, ΔV(a/d)=0.

In step S44, ΔV(a/d) is output to speed adjustment control process and the process is terminated.

Further, steps from S36 to S44 can be expressed as shown in FIG. 6.

FIG. 6 is an example when VWz=2,000 and fc=4 MHz.

Following is an explanation of Steps S36 to S44 in FIG. 5 based on flowchart in FIG. 6.

Step S51 indicates start of process.

In step S52, t(a/d) is compared with 0. If t(a/d)=0, process in step S83 is carried out; if t(a/d)≠0, process in step S53 is carried out.

In step S53, |VS−V0| is compared with 0. If |VS−V0|=0, process in step S83 is carried out; if |VS−V0|≠0, process in step s54 is carried out.

In step S54, |VS−V0| is compared with 2,000. If |VS−V0|≦2,000, process in step S55 is carried out and K is substituted by 0. If |VS−V0|>2,000, process in step S56 is carried out.

In step S56, |VS−V0| is compared with 4,000. When |VS−V0|≦4,000, process in step S57 is carried out and K is substituted by 1. When |VS−V0|>4,000, process in step S58 is carried out.

In step S58, |VS−V0| is compared with 8,000. When |VS−V0|≦8,000, process in step S59 is carried out and K is substituted by 2. When |VS−V0|>8,000, process in step S60 is carried out.

In step S60, |VS−V0| is compared with 16,000. When |VS−V0|≦16,000, process in step S61 is carried out and K is substituted by 3. When |VS−V0|>16,000, process in step S62 is carried out.

In step S62, |VS−V0| is compared with 32,000. When |VS−V0|≦32,000, process in step S63 is carried out and K is substituted by 4. When |VS−V0|>32,000, process in step S64 is carried out.

In step S64, |VS−V0| is compared with 64,000. When |VS−V0|≦64,000, process in step S65 is carried out and K is substituted by 5. When |VS−V0|>64,000, process in step S66 is carried out.

In step S66, |VS−V0| is compared with 128,000. When |VS−V0|≦128,000, process in step S67 is carried out and K is substituted by 6. When |VS−V0|>128,000, process in step S68 is carried out.

In step S68, k is substituted by 7.

In step S69, t(a/d) is compared with 1,024. When t(a/d)<1,024, process in step S70 is carried out and L is substituted by 0. When t(a/d)≧1,024, process in step S71 is carried out.

In step S71, t(a/d) is compared with 2,048. When t(a/d)<2,048, process in step S72 is carried out and L is substituted by 1. When t(a/d)≧2,048, process in step S73 is carried out.

In step S73, t(a/d) is compared with 4,096. When t(a/d)<4,096, process in step S74 is carried out and L is substituted by 2. When t(a/d)≧4,096, process in step S75 is carried out.

In step S75, t(a/d) is compared with 8,192. When t(a/d)<8,192, process in step S76 is carried out and L is substituted by 3. When t(a/d)≧8,192, process in step S77 is carried out.

In step S77, t(a/d) is compared with 16,384. When t(a/d)<16,384, process in step S78 is carried out and L is substituted by 4. When t(a/d)≧16,384, process in step S79 is carried out.

In step S79, L is substituted by 5.

In step S80, K is compared with L. When K>L, process in step S82 is carried out. In step S82, ΔV(a/d)min=1 where ΔV is a value obtained by left shift of (K−L) bits, which is expressed as a binary number "1". When K≦L, process in step S81 is carried out and ΔV(a/d) is substituted by 1.

In step S83, ΔV(a/d) is substituted by 0.

In step S84, ΔV(a/d) is output to the speed adjustment control process and terminated. The method mentioned above can be realized by either of software and hardware.

FIG. 7 is a data table for calculation of amount of variation in speed ΔV(a/d) in the present embodiment. These are the results obtained when the process in the flowchart in FIG. 5 is carried out. FIG. 8 illustrates actual values when control frequency fc=4[MHz], VWz=2,000[Hz], ΔV(a/d)min=1[Hz], tWz=1,024[ms], and t(a/d)min=1[ms] are substituted in the equations shown in FIG. 7.

The data table in this figure provides |command speed (VS)–initial speed (V0)|[Hz], speed adjustment time t(a/d) [HZ] as input data and obtains amount of variation in speed ΔV(a/d)[Hz] as output data.

In this case, there are 10 values of |VS–V0| and 35 values of ΔV(a/d).

In FIG. 9, in order to make ΔV(a/d) narrower, ΔV is made to vary for each ΔV(a/d)min. FIG. 9 illustrates actual values when control frequency fc=4[MHz], VWz=2,000[Hz], ΔV(a/d)min=1[Hz], t(a/d)min=1[ms], te(a/d)=0.5[ms] are substituted in the equations shown in FIG. 7. Moreover, tWz cannot be a fixed value.

In this case, there are 102 values of |VS–V0|, 103 values of t(a/d), and 5,052 values of ΔV(a/d). However, due to large number of combinations, it is difficult to bring it into practice. Therefore, ΔV(a/d) is taken as (K–L)th power of 2, as shown in FIG. 8, in the present embodiment.

This allows reducing the number of combinations and makes it easy to bring this method into practice. In the second embodiment, since the determination of the amount of variation in speed ΔV(a/d) is put in the form of a data table, it has enabled to find the value of ΔV(a/d) promptly by using a simple method.

FIG. 10 is flowchart of a method for calculation of the control frequency (fc). This flowchart is provided only for reference and, therefore, will not be explained in detail.

According to the first and the second embodiments, the number of divisions of accelerated or decelerated speed and the number of divisions of speed adjustment time are made variable while giving precedence to the amount of variation in speed ΔV(a/d), the number of divisions is made maximum all the time, and the speed adjustment is carried out by varying the output speed for each speed variation interval Δt(a/d). As a result, the synchronism of stepping motor cannot be lost so easily, it is possible to shorten the speed adjustment time and the processing time before start up, and the tact time and plurality axes control can be brought into practice at low cost.

Here, the tact time is a time taken for one process and in this case, positioning operation is considered as one process. When the acceleration and deceleration time, and the processing time before start up become short, the operating time for positioning of same amount of shift becomes short.

Figure 11:
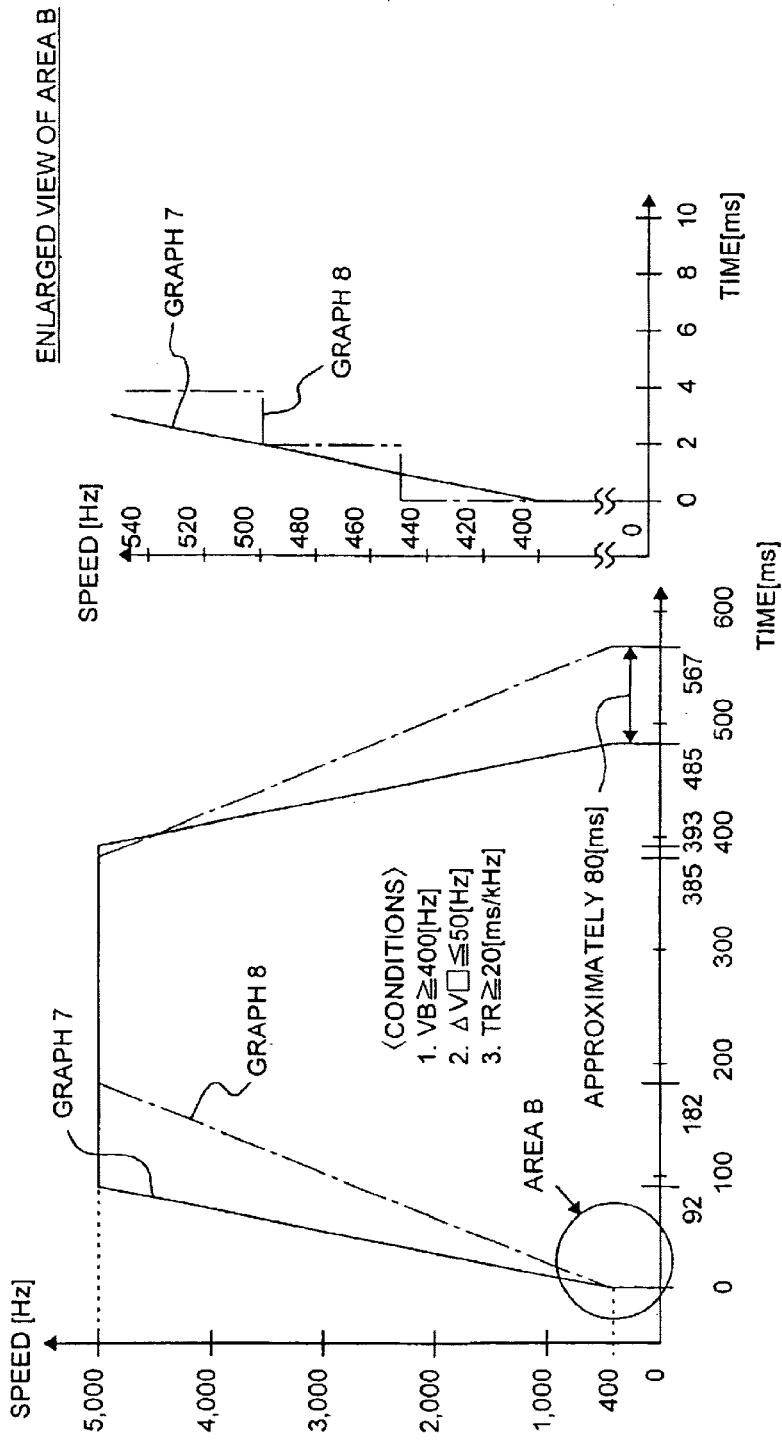
FIG. 11 is a comparison of speed adjustment time and positioning time between an example of this invention and that of conventional method.
Figure 12:
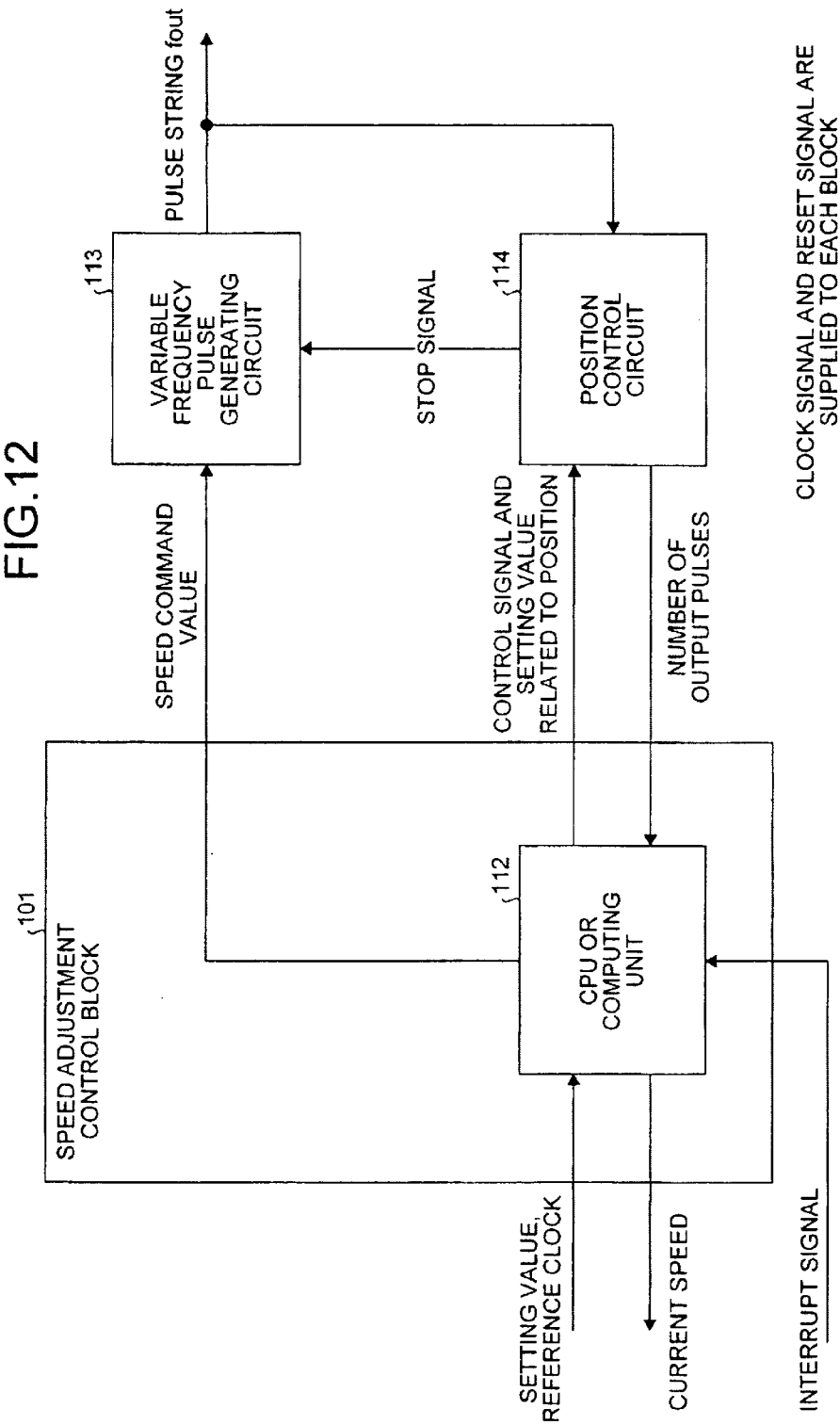
FIG. 12 represents a whole block of the conventional fixed time interval method.
Figure 13:
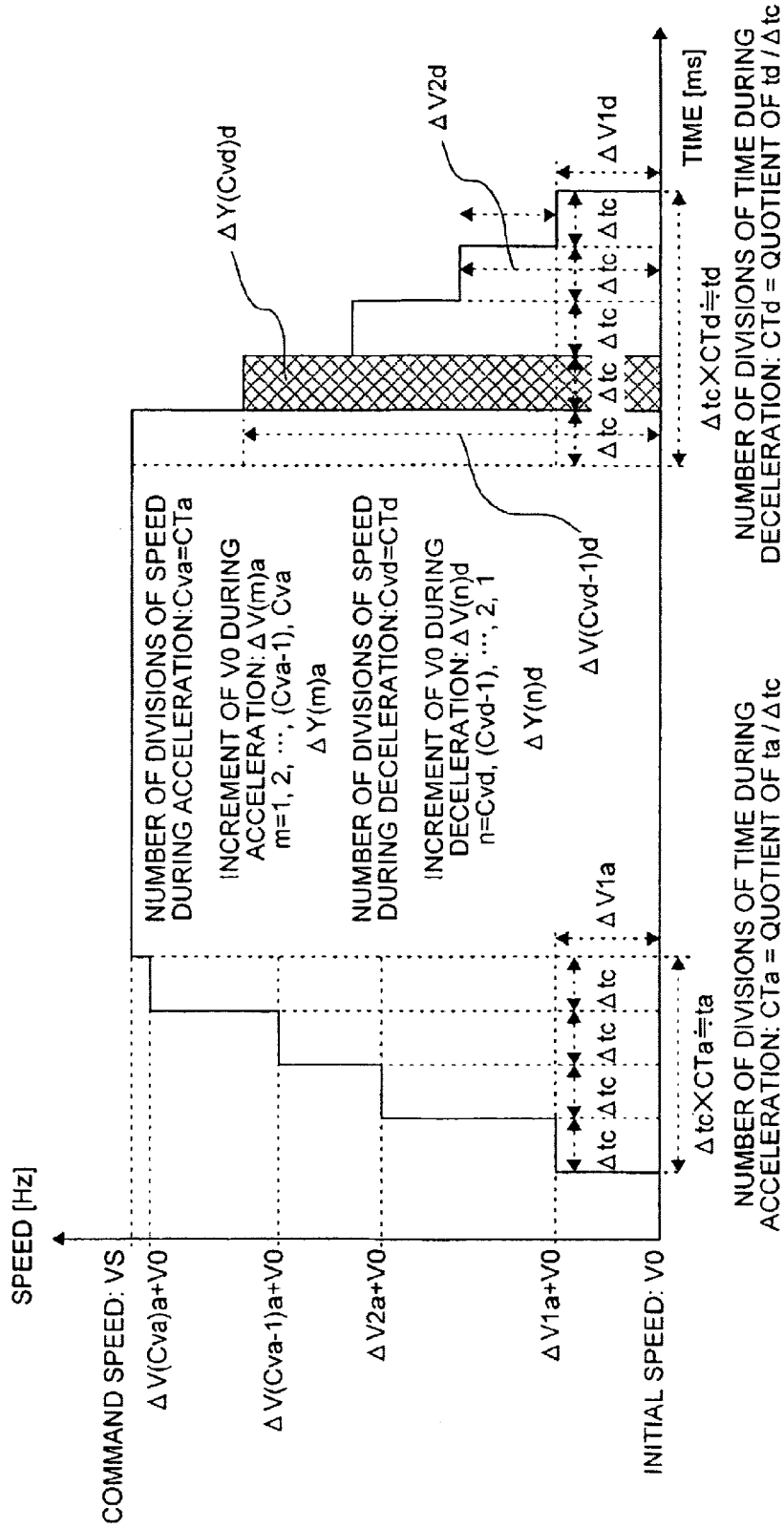
FIG. 13 is an example of speed change according to the conventional fixed time interval method.
Figure 14:
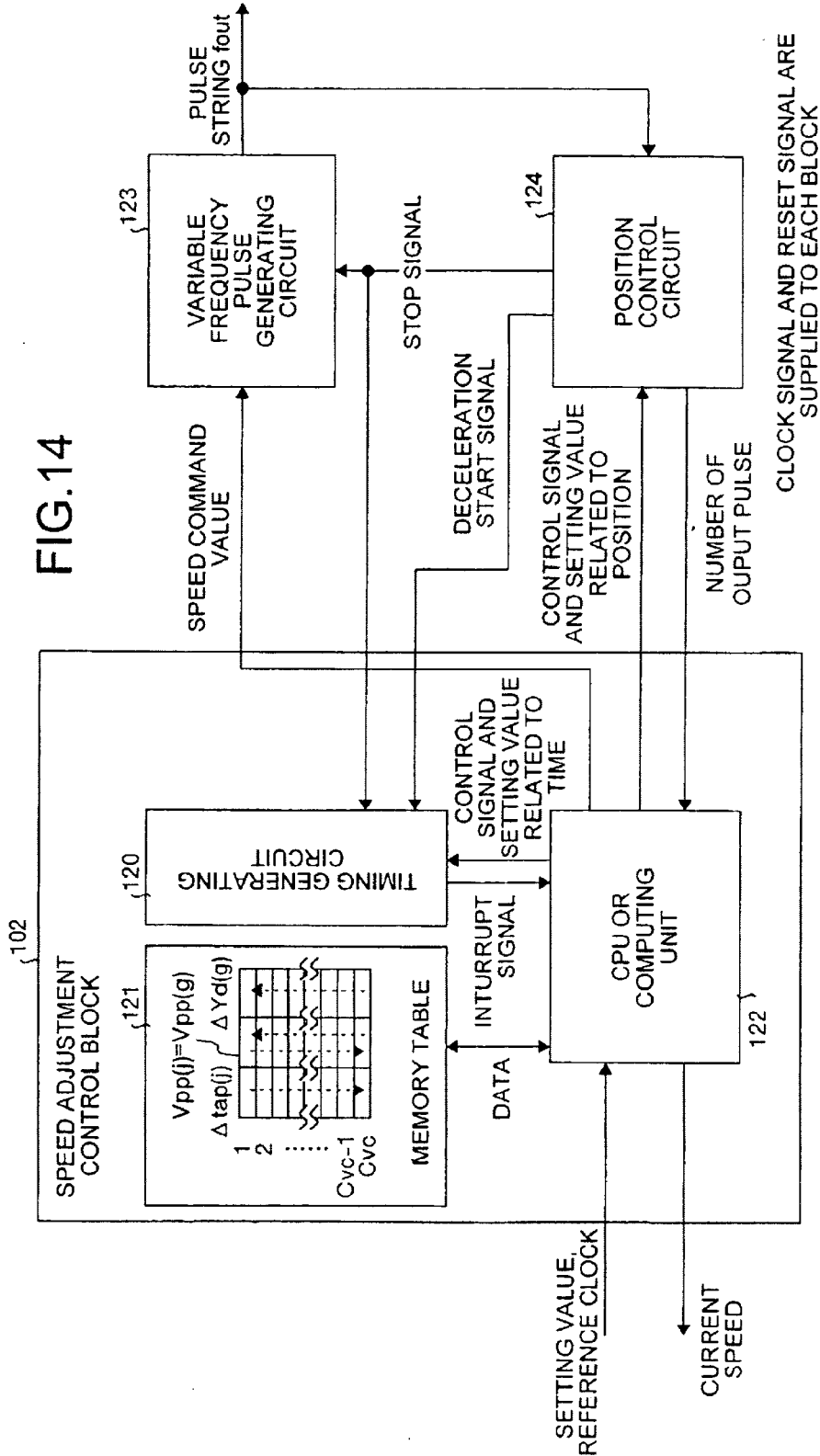
FIG. 14 represents a whole block of the conventional fixed number of divisions method.
Figure 15:
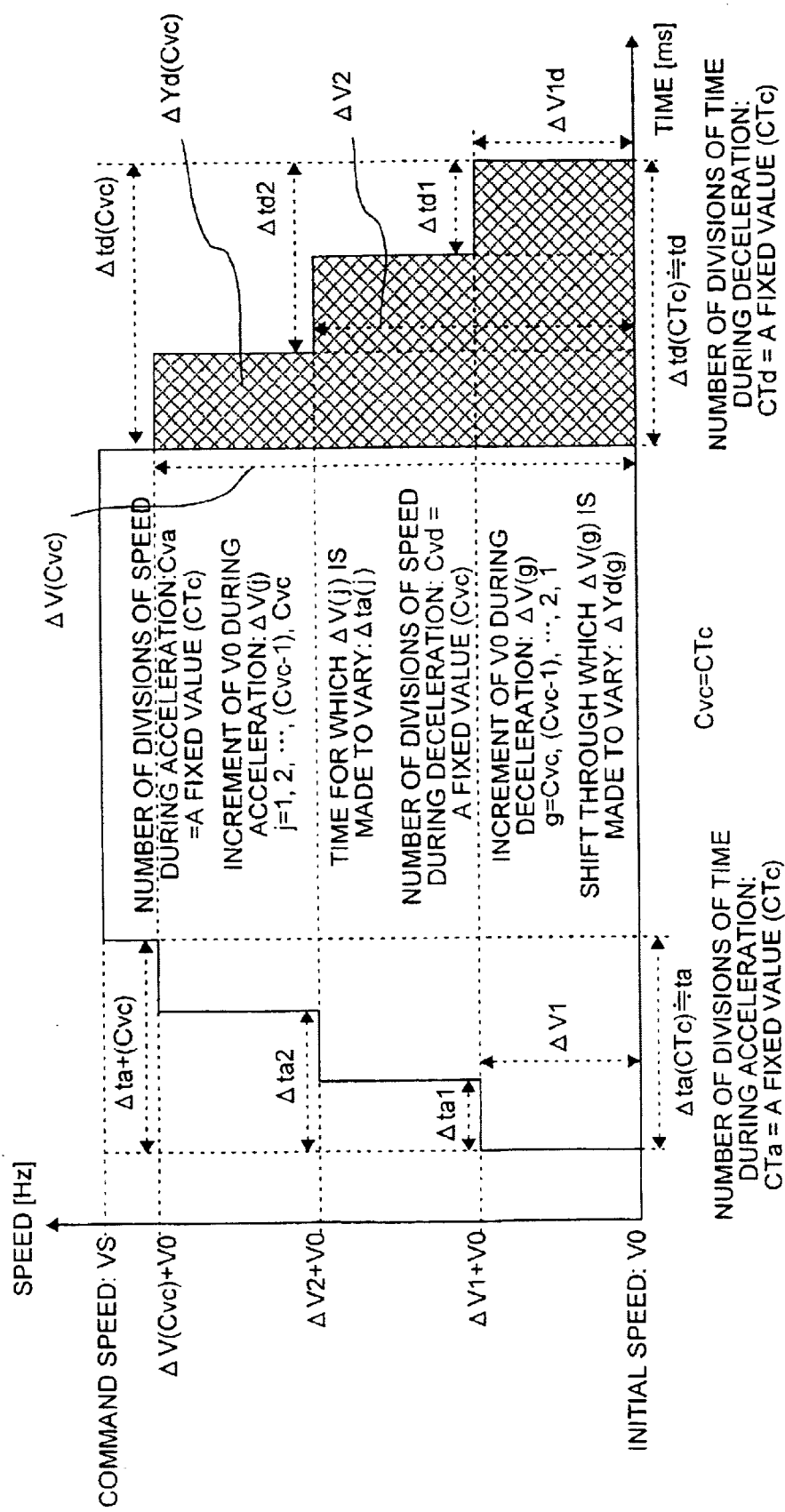
FIG. 15 is an example of speed change according to the conventional fixed number of divisions method.

A concrete example of improvement in tact time is explained while referring to FIG. 11.

Following is the explanation of factors related to the amount of variation in speed [ΔV(a/d)] out of factors which are to be taken into consideration in order to prevent the stepping motor from losing synchronism.

(1) Vibration Characteristics of Stepping Motor During Running.

At low speed, because there are considerable vibrations, the stepping motor cannot run smoothly. Especially, in a region centered at about 200[Hz] (0 to approximately 400 [Hz]), the amount of vibrations becomes high. It is necessary to set an initial speed V0 beyond this region.

(2) Inertial Load-Self Start Up Frequency (Speed Just Before Losing Synchronism) Characteristics, Ratio of Inertia.

Since a rotor of the stepping motor or the stepping motor itself has moment of inertia, there is a delay or advancement in rotation of motor shaft at an instantaneous start up or stop.

The amount of such delay or advancement varies according to the speed. When the amount goes beyond certain value, the motor cannot follow pulse speed and loses synchronism (causes misstepping). The speed just before losing synchronism is called as the self-start up frequency. Variation in the maximum self-start up frequency corresponding to the inertial load can be approximated by the following formula:

$$f = fs/\sqrt{(1+JL/Jo)}[Hz]$$

where f is the maximum self-start up frequency [Hz] when there is inertial load, fs is the maximum self-start up frequency [Hz] of the motor independently, Jo is moment of inertia of the motor [gcm2(kg·m2)], and JL is moment of inertia of load [gcm2(kg·m2)] (J=GD2/4).

Here, it is necessary that the ratio of inertia=JL/Jo≦ (5~10). Consequently, (0.302×fs)≦f≦fs[Hz]. Therefore, it is necessary to set the initial speed (V0) smaller than the self-start up frequency (f). Also it is necessary to make [initial speed (V0)+ amount of variation in speed (ΔV(a/d))] smaller than this self-start up frequency.

(3) Rate of Speed Adjustment

Rate of speed adjustment can be calculated by TR=speed adjustment time [ms]/|command speed [kHz]–initial speed [kHz]|[ms/kHz].

The rate of speed adjustment determined by the above equation has to be greater than or equal to the value of the rate of speed adjustment of the stepping motor (approximately from 20 to 30) that is used. When the rate of speed adjustment determined by the calculation is less than the value of the rate of speed adjustment of the stepping motor, it is necessary to carry out changes like extending the set speed adjustment time.

Following is the explanation of an example with a two-phase motor (fs=1,500[Hz]) considering points (1), (2), and (3) mentioned above and number of output pulses=2,000 [pulses], command speed VS=5,000[Hz], and |command speed (Vs)–initial speed (V0)|.

Following three conditions are to be satisfied.

1) As a measure against vibrations, initial speed (V0) is set to 400[Hz] from because initial speed (V0) has to be greater than or equal to 400[Hz].
2) As a measure against loss of synchronism, following values are set: ratio of inertia ≦10 and [initial speed (V0)+amount of variation in speed [ΔV(a/d)]]<[f≈(0.302× fs)][Hz].
3) As a measure against loss of synchronism, rate of speed adjustment is set greater than or equal to 20[ms/kHz].

To start with, ΔV(a/d)[Hz] is determined from [initial speed (V0)+amount of variation in speed [ΔV(a/d)]<[f≈ (0.302×fs)][Hz]. Since the initial speed (V0)=400[Hz], 0≦ΔV(a/d)<(0.302×fs–400)[Hz]. In a two phase motor (fs= 1,500), ΔV(a/d)<(0.302×fs–400)=53[Hz]. Therefore, ΔV is set to less than or equal to 50[Hz].

Further, actual speed adjustment time is determined from rate of speed adjustment ≧20[ms/kHz]. Since the rate of speed adjustment 20≦speed adjustment time/|command speed|initial speed|[ms/kHz], the speed adjustment time ≧20×|command speed–initial speed|[ms]. Furthermore, since the command speed (VS)=5[kHz] and the initial speed (V0)=0.4[kHz], the actual speed adjustment time ≧20×|5– 0.4|=92[ms].

Next, the minimum speed adjustment time that satisfies the condition ΔV(a/d)≦50[Hz] is determined. In the present embodiment, supposing that the speed adjustment time could be shortened up to the actual speed adjustment time during the rate of speed adjustment time, when the minimum setting of speed adjustment=92[ms], according to FIG. 8, |command speed (VS)–initial speed (V0)|=|5,000–400|=4, 600[Hz] and speed adjustment time=92[ms]. Therefore $\Delta V(a/d)=2$[Hz] and satisfies the condition $\Delta V(a/d) \leq 50$[Hz].

Thus, even if the minimum speed adjustment time=the minimum actual speed adjustment time=92[ms], the condition $\Delta V \leq 50$[Hz] is satisfied and the motor does not lose synchronism.

In other words, the minimum speed adjustment time that satisfies the condition of $\Delta V \leq 50$[Hz] is 92[ms].

On the other hand, in the conventional fixed time interval method, when set speed adjustment time=$\Delta tc \times CT(a/d)=\Delta tc \times Cv(a/d)$, $Cv(a/d)$=[|command speed (VS)−initial speed (V0)|/$\Delta V$−raise decimal of resultant value to the next whole number], set speed adjustment time=$\Delta tc \times$[|command speed (VS)−initial speed (V0)|/$\Delta V$−raise decimal of resultant value to the next whole number], and $\Delta tc$=2[ms], then minimum the speed adjustment time=2[ms]×(|5,000−400|[Hz]/50[Hz]−raise decimal of a resultant value to the next whole number)=2[ms]×92=184[ms]. Since the speed is almost same as the command speed (VS) in the 92nd value of $\Delta tc$, minimum actual speed adjustment time is changed to 2[ms]×(92−1)=182[ms].

In other words, in conventional technique, the minimum speed adjustment time, which satisfies the condition $\Delta V(a/d) \leq 50$[Hz] is 182[ms].

Further, the effect on tact time (difference of positioning time when number of output pulses=2,000 [pulses] are positioned) is explained below:

positioning time=(actual acceleration time+constant speed time+actual deceleration time)[ms], constant speed time=[(number of output pulses−number of output pulses during actual acceleration time−number of output pulses during actual deceleration time) [pulses]/command speed (VS)[kHz]][ms], number of output pulses during actual speed adjustment time≈[(initial speed (V0)+command speed (VS))[kHz]× actual speed adjustment time [ms]]/2[pulses], number of output pulses during actual deceleration time≈ [(initial speed (V0)+command speed (VS))[kHz]×actual deceleration time [ms]]/2[pulses].

In the present embodiment, number of output pulses during actual speed adjustment time≈[(initial speed (V0)+command speed (VS))[kHz]× actual speed adjustment time [ms]]/2=[(0.4+5)×92]/2=248.4 [pulses], number of output pulses during actual deceleration time≈ [(initial speed (V0)+command speed (VS))[kHz]×actual deceleration time [ms]]/2=[(0.4+5)×92]/2=248.4[pulses], constant speed time=[(number of output pulses−number of output pulses during actual acceleration time−number of output pulses during actual deceleration time) [pulses]/command speed (VS)[kHz]]≈(2,000−248.4−248.4)/5= 300.64≈301 [ms], positioning time=(actual acceleration time+constant speed time+actual deceleration time)≈(92+301+92)=485 [ms].

Whereas, in the conventional fixed time interval method, number of output pulses during actual acceleration time≈ [(initial speed (V0)+command speed (VS))[kHz]×actual acceleration time [ms]]/2=[(0.4+5)×182]/2=491.4[pulses], number of output pulses during actual deceleration time≈ [(initial speed (V0)+command speed (VS))×actual deceleration time [ms]]/2=[(0.4+5)×182]/2=491.4[pulses], constant speed time=[(number of output pulses−number of output pulses during actual acceleration time−number of output pulses during actual deceleration time) [pulses]/command speed (VS) [kHz]]≈(2,000−491.4−491.4)/5= 203.4≈203[ms], positioning time=(actual acceleration time+constant speed time+actual deceleration time)≈(182+203+182)=567 [ms].

Consequently, regarding this condition, it becomes possible in the embodiment of the present invention to shorten the positioning time by approximately (567−485)= 82≈approximately 80[ms] than the conventional time interval method.

According to the present invention, the amount of variation in speed $\Delta V(a/d)$ is determined using the data table, the number of divisions of accelerated or decelerated speed and the number of divisions of speed adjustment time are made variable, number of divisions is made maximum all the time, speed adjustment is carried out by varying the output speed for each speed variation interval $\Delta t(a/d)$. As a result, the synchronism of stepping motor cannot be lost so easily, it is possible to shorten the speed adjustment time and the processing time before start up, and the tact time and plurality of axes control can be brought into practice at low cost.

Moreover, since the determination of the amount of variation in speed $\Delta V(a/d)$ is put in the form of a data table, it has enabled to find the value of $\Delta V(a/d)$ promptly by using a simple method and to reduce the load on the speed adjustment control block.

INDUSTRIAL APPLICABILITY

As mentioned above, the speed adjustment control method according to the present invention is suitable for speed variation control of the stepping motor.

What is claimed is:

1. A speed adjustment method, comprising:
   a process of determining an amount of variation in speed [$\Delta V(a/d)$] from a data table of |command speed (VS)− initial speed (V0)| and speed adjustment time [$t(a/d)$];
   a process of determining number of divisions [$cv(a/d)$] of |command speed (VS)−initial speed (V0)| by dividing |command speed (VS)−initial speed (V0)| by the amount of variation in speed [$\Delta V(a/d)$];
   a process of determining number of divisions [$CT(a/d)$] of the speed adjustment time by subtracting 1 from the number of divisions [$cv(a/d)$] of |command speed (VS)−initial speed (V0)|;
   a process of determining an interval of speed variation [$\Delta t(a/d)$] by dividing the speed adjustment time [$t(a/d)$] by the number of divisions [$CT(a/d)$] of the speed adjustment time;
   a process of determining, during acceleration, speed by adding the amount of variation in speed [$\Delta V(a)$] to the initial speed (V0), and determining subsequent speed at each speed variation interval [$\Delta t(a)$] by adding the amount of variation in speed [$\Delta V(a)$] to previously determined speed;
   a process of switching over to the command speed (VS) when the speed determined is equal to the command speed (VS); and
   a process of determining, during deceleration, speed by subtracting the amount of variation in speed [$\Delta V(d)$] from the command speed (VS) or current speed, and determining subsequent speed at each speed variation interval [$\Delta t(a)$] by subtracting the amount of variation in speed [$\Delta V(d)$] from previously determined speed.

2. The speed adjustment method according to claim 1, wherein the speed variation interval [$\Delta t(a/d)$] is variable and provided independently from a control cycle that generates output pulses.

3. The speed adjustment method according to claim 1, further comprising:

a process of inputting parameters the initial speed (V0), a minimum value (VSmin) of the command speed, a maximum value (VSmax) of the command speed, the speed adjustment time [t(a/d)], a minimum value [t(a,d)min] of the speed adjustment time, a maximum value [t(a/d)max] of the speed adjustment time, a tolerance range condition [te(a/d)] of the speed adjustment time [t(a/d)], a condition for the amount of variation in speed, a control frequency (fc), and a rank classification time (tWz) of the speed adjustment time;

a process of determining a limit range (VWz) of speed difference based on the parameters;

a process of classifying |command speed (VS)−initial speed (V0)| in ranks in the limit range (VWz) of speed difference based on the limit range (VWz) of difference and rank classification time (tWz) of the speed adjustment time;

a process of classifying the speed adjustment time [t(a/d)] in ranks in the rank classification time (tWz); and a process of determining the amount of variation in speed [ΔV(a/d)] in accordance with a combination of the |command speed (VS)−initial speed (V0)| and the speed adjustment time [t(a/d)], and thereby preparing the data table.

4. The speed adjustment method according to claim 3, wherein the classification of rank in the limit range (VWz) of speed difference |command speed (VS)−initial speed (V0)| is carried out by (VWz×power of 2), classification of rank in the rank classification time (tWz) of the speed adjustment time [(t(a/d)] is carried out by (tWz×power of 2), and the amount of variation in speed [ΔV(a/d)] is determined by the minimum value of command speed (VSmin)×power of 2.

* * * * *